(12) United States Patent
Yamamoto et al.

(10) Patent No.: US 7,002,277 B2
(45) Date of Patent: Feb. 21, 2006

(54) MOTOR AND MOTOR MANUFACTURING APPARATUS

(75) Inventors: Tomonaga Yamamoto, Fujiyoshida (JP); Takuya Maeda, Yamanashi (JP)

(73) Assignee: Fanuc LTC, Yamanashi (JP)

( * ) Notice: Subject to any disclaimer, the term of this patent is extended or adjusted under 35 U.S.C. 154(b) by 0 days.

(21) Appl. No.: 10/792,915

(22) Filed: Mar. 5, 2004

(65) Prior Publication Data

US 2005/0023925 A1 Feb. 3, 2005

(30) Foreign Application Priority Data

Jul. 29, 2003 (JP) .............................. 2003-282123

(51) Int. Cl.
*H02K 15/02* (2006.01)
*H02K 1/06* (2006.01)

(52) U.S. Cl. ...................... 310/216; 310/42; 310/254; 310/261; 29/596

(58) Field of Classification Search ................. 310/42, 310/216, 217, 254, 259, 261; 29/596, 598
See application file for complete search history.

(56) References Cited

U.S. PATENT DOCUMENTS

| | | | | |
|---|---|---|---|---|
| 4,871,934 A | * | 10/1989 | Okamoto et al. ........... | 310/166 |
| 5,266,859 A | * | 11/1993 | Stanley ...................... | 310/216 |
| 6,487,770 B1 | | 12/2002 | Bernauer et al. ............. | 29/598 |
| 6,829,815 B1 | * | 12/2004 | Henschel et al. ............. | 29/598 |
| 2002/0067092 A1 | | 6/2002 | Crapo et al. ........... | 310/156.42 |
| 2002/0140308 A1 | | 10/2002 | Inayama et al. ....... | 310/156.47 |

FOREIGN PATENT DOCUMENTS

| | | |
|---|---|---|
| DE | 198 51 217 A1 | 5/2000 |
| EP | 0 111 193 | 6/1994 |
| JP | 63-140645 | 3/1996 |
| JP | 8-223831 | 8/1996 |
| JP | 10-066283 | 3/1998 |
| JP | 1 233 503 A2 | 8/2002 |
| JP | 2002-320350 | 10/2002 |

OTHER PUBLICATIONS

EP Search Report for corresponding EP Application No. 04 25 1275.6-2207 Dec. 12, 2004.

* cited by examiner

*Primary Examiner*—Burton Mullins
(74) *Attorney, Agent, or Firm*—Staas & Halsey LLP

(57) ABSTRACT

Flat rolled magnetic steel sheets and strip or a die is turned in the press forming process. Rotor cores are stacked with turning through an angle which is an odd number multiple of about (360°/(number of slots in the motor×natural number n×2)) and stator cores are stacked with turning through an angle which is an odd number multiple of (360°/(number of poles in the motor×natural number n×2)). Stacking with turning through an angle which is an odd number multiple converts the phases of cogging torques into mutually opposite phases and cancels and reduces the cogging torque caused by magnetic anisotropy.

10 Claims, 23 Drawing Sheets

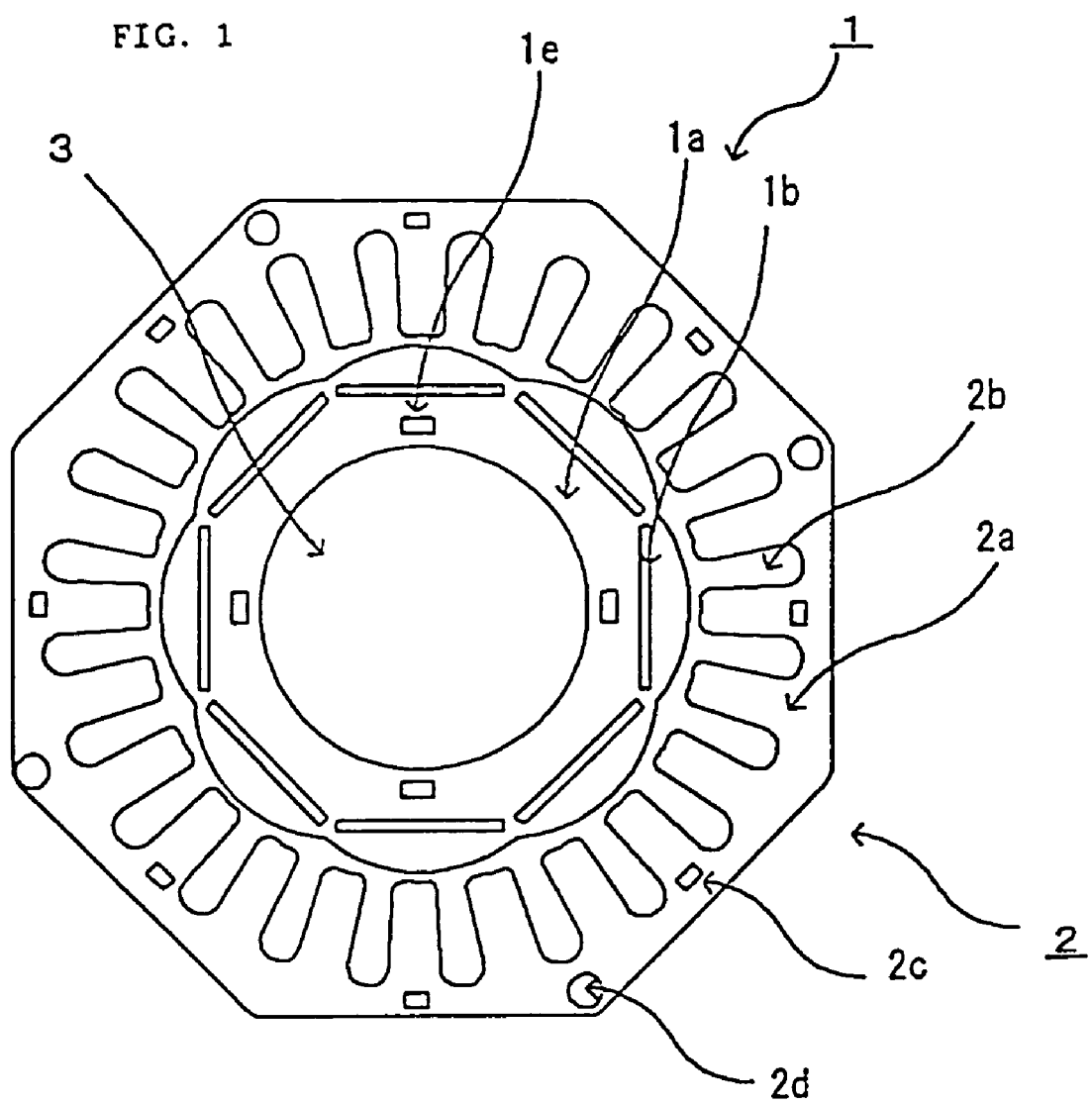

FLAT ROLLED MAGNETIC STEEL SHEETS AND STRIP (HOOP MATERIAL) AND ROLLING DIRECTION

FIG. 7
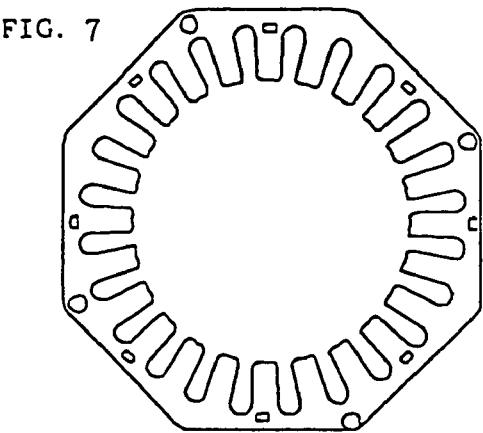
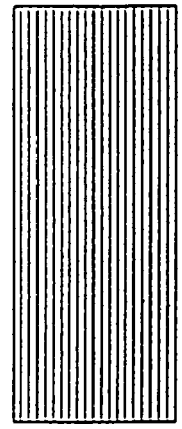
=
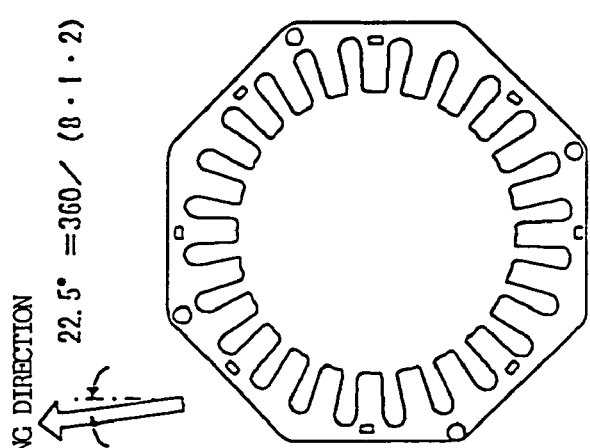
+
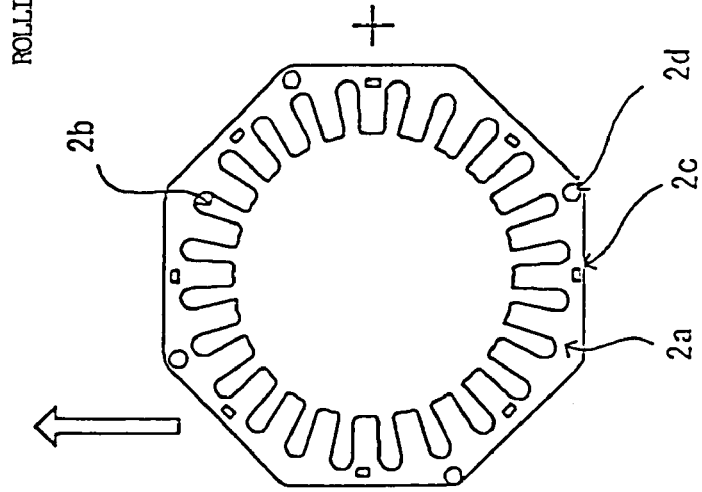
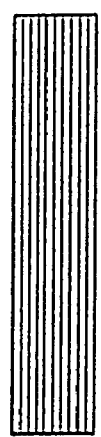

FIG. 11A
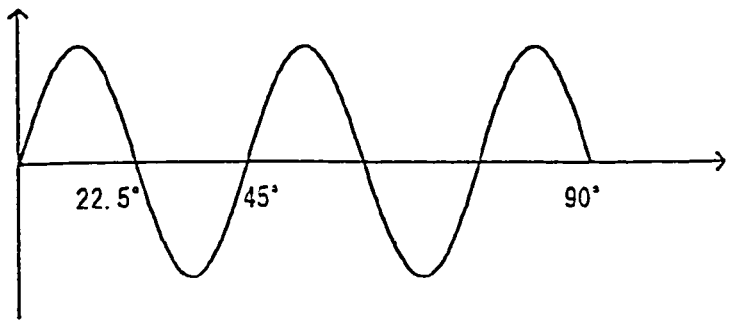
FIG. 11B  360° / (NUMBER OF POLES (8)·2 ) · 1 = 22.5°
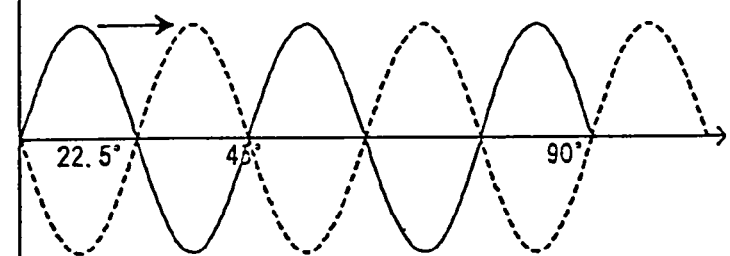
FIG. 11C  360° / (NUMBER OF POLES (8)·2) · 3 = 67.5°
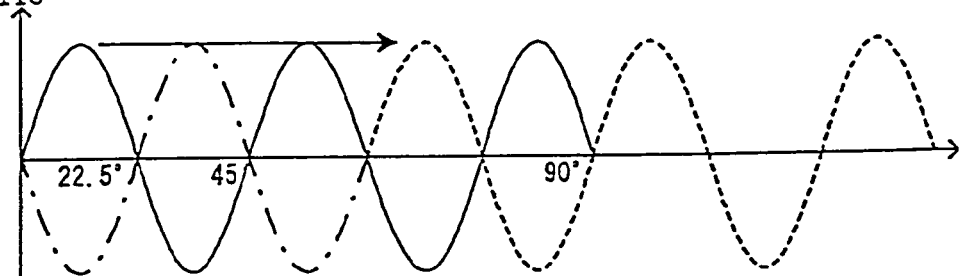
FIG. 11D
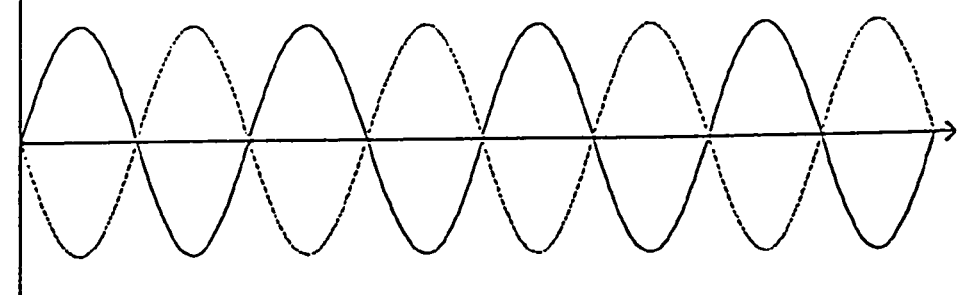

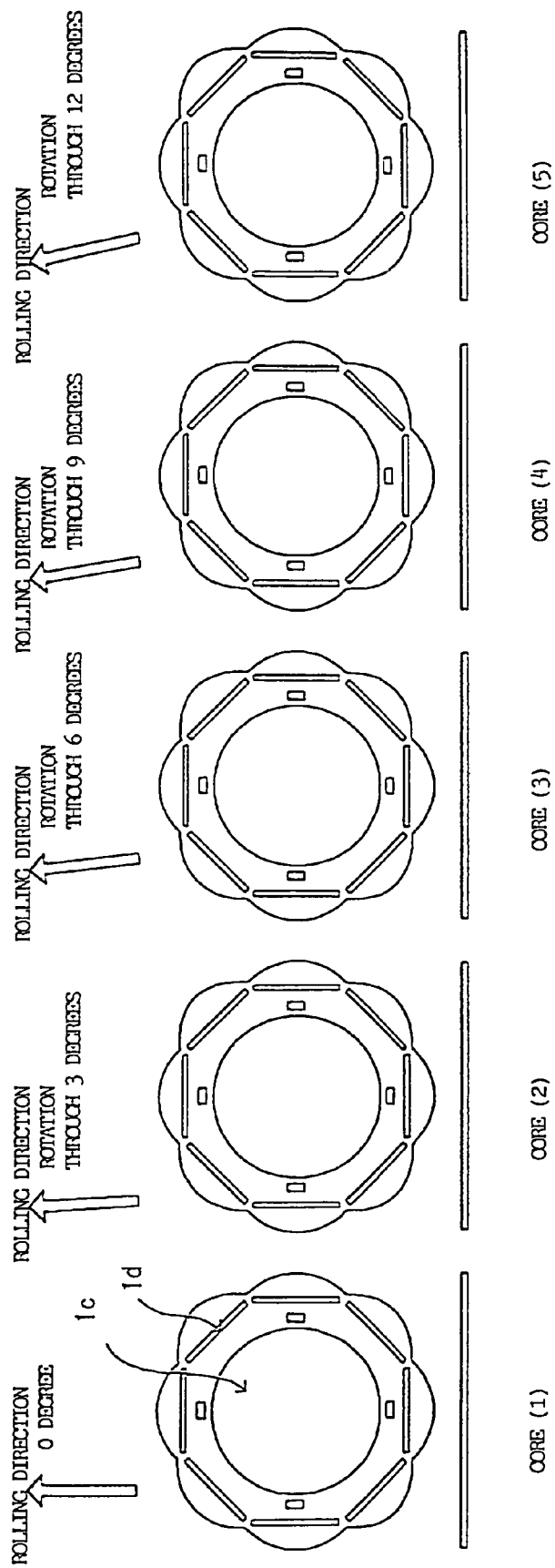

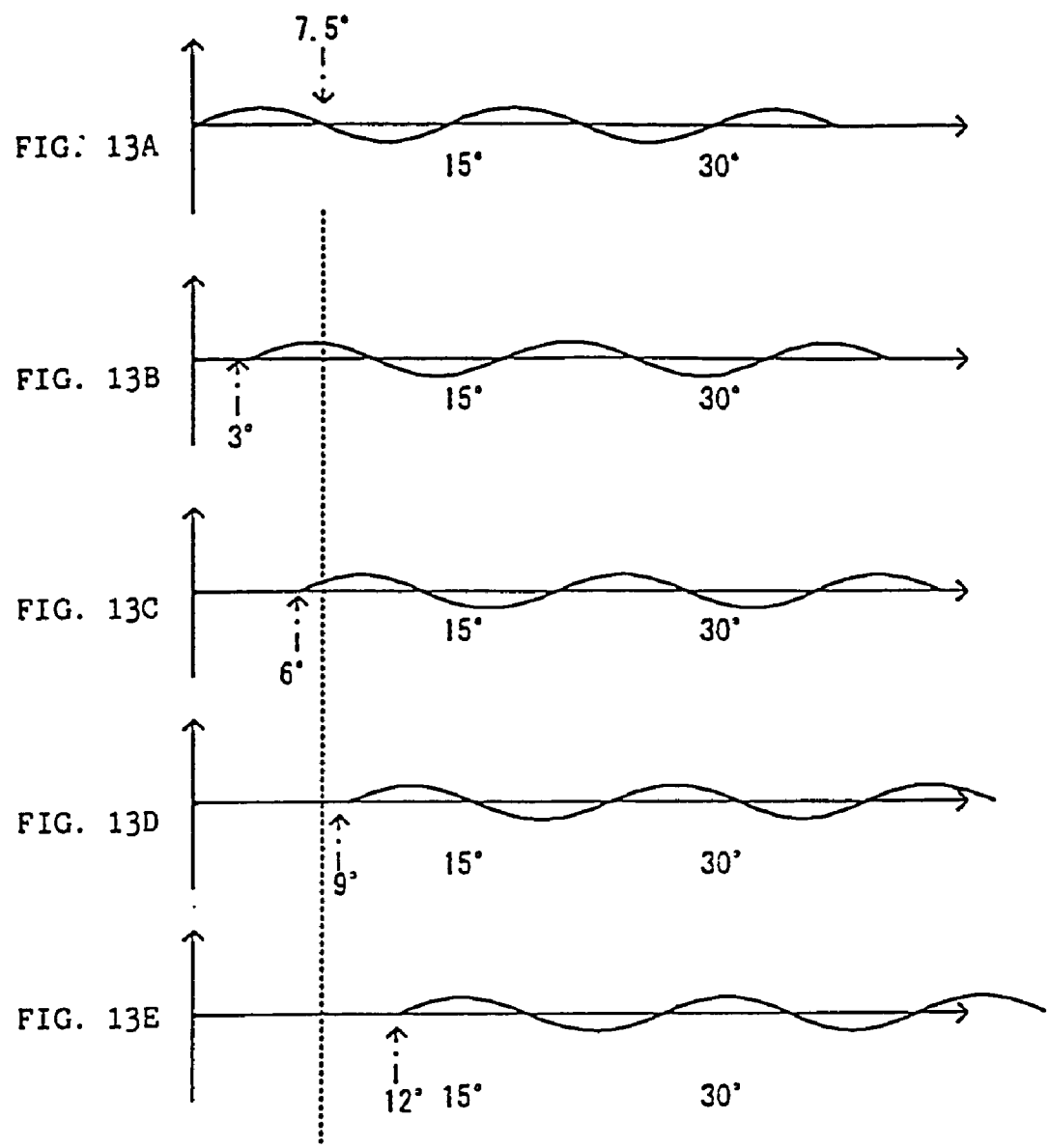

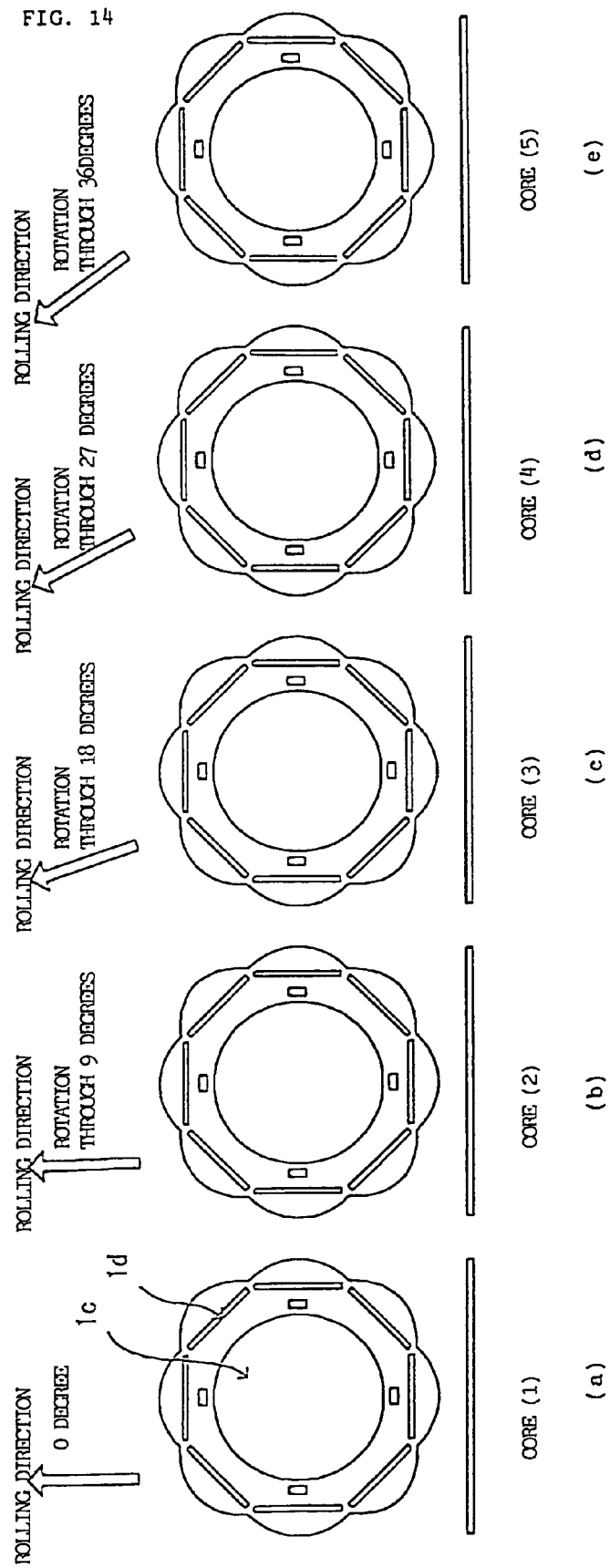

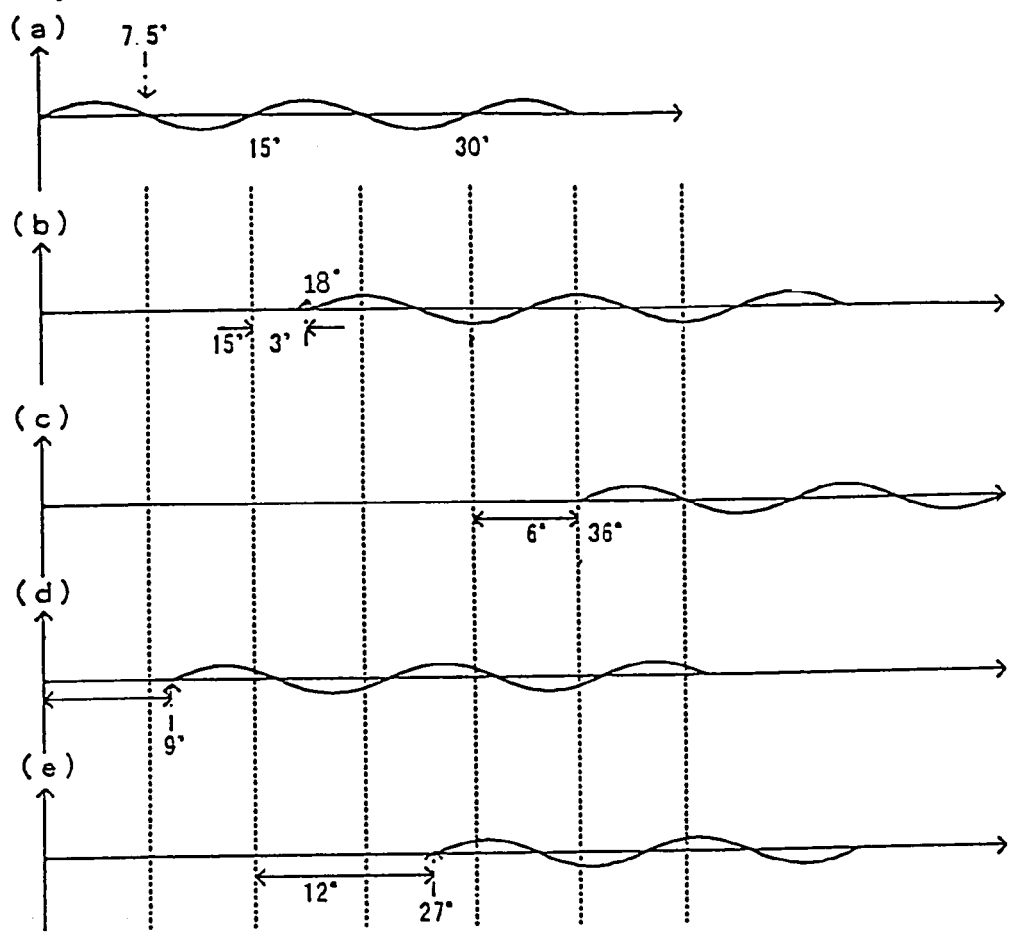

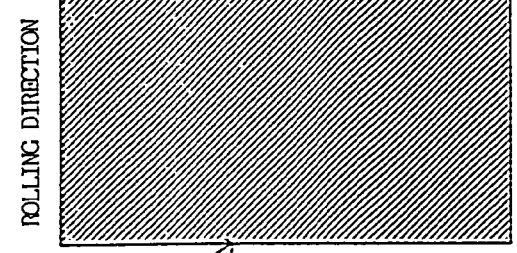
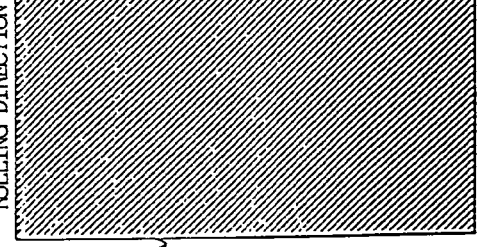
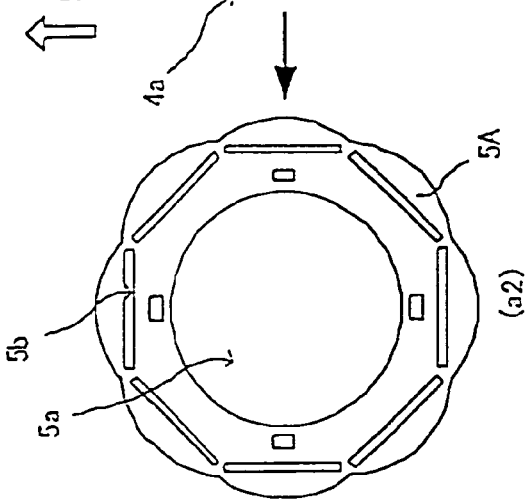
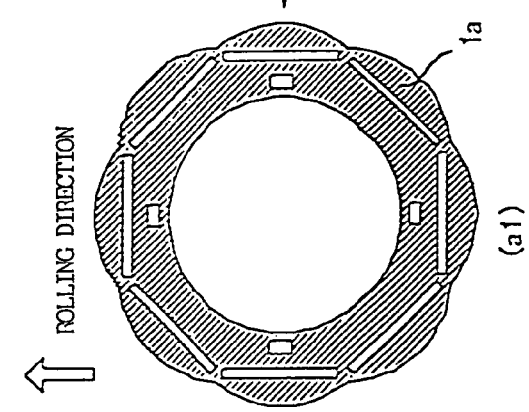
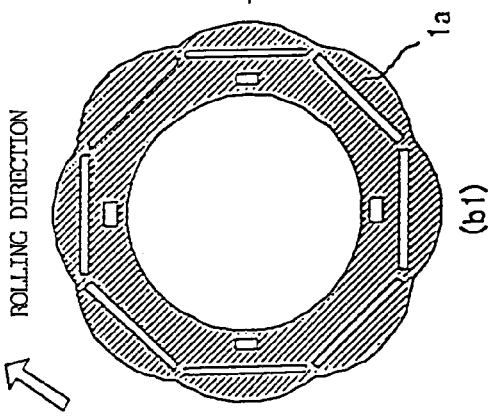
FIG. 17A  FIG. 17B

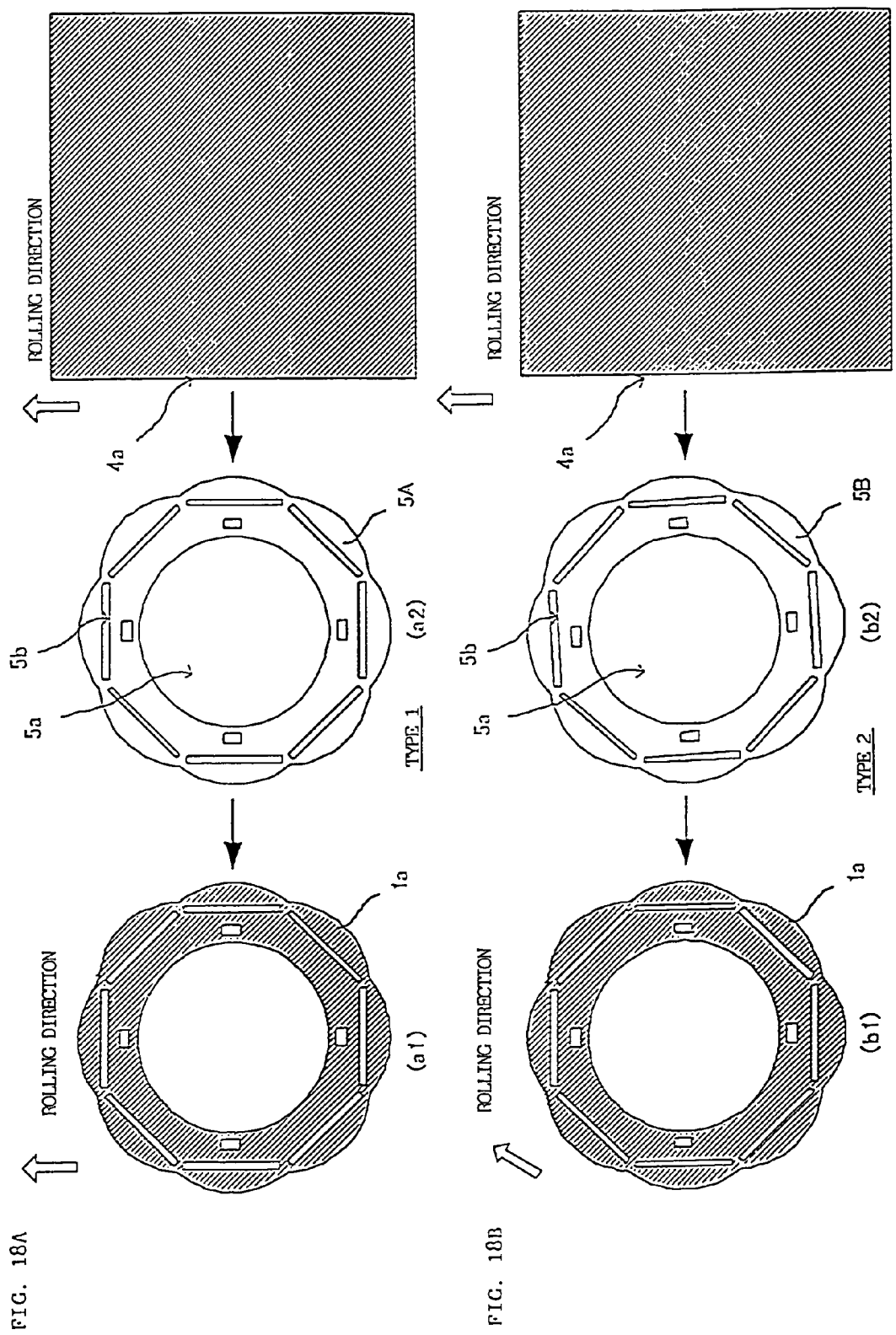

MOTOR AND MOTOR MANUFACTURING APPARATUS

BACKGROUND OF THE INVENTION

1. Field of the Invention

The present invention relates to a motor and a motor manufacturing apparatus, in particular, to cogging torque reduction.

2. Description of the Related Art

In motors comprising a rotor with a magnet embedded therein and a stator having slots provided equidistantly in a circumference and a coil portion formed therein by winding in the slots, those motors being rotationally driven by the torque of the magnet and the reluctance torque of the coil, when the rotor rotates, a pulsating cogging torque is generated in the rotor.

When the magnet disposed inside the rotor forms a magnetic circuit in which the generated magnetic flux is closed via the slots in the stator, the total sum of electromagnetic attraction forces at a rotation angle of the rotor with respect to the stator in the rotation direction varies according to the relative position of the rotor and stator. Because the stator is composed of repeating slots and slot open portions having different magnetic resistances, the electromagnetic attraction force switches in the rotor in the rotation direction or counter-rotation direction of the rotor when one slot pitch is passed as the rotor rotates, the torque varies with a period proportional to the number of poles in the magnet or the number of slots, and a cogging torque is generated.

Conventional measures aimed at the reduction of this cogging torque included the improvement of rotor shape, stator shape, and accuracy of dies used for forming the rotor and stator. For example, skewing is a known method by which when the rotor is stacked in the axial direction, it is skewed by arranging with an equidistant displacement in a circumference direction which is the rotor rotation direction. With such a method, when the magnetic poles of the magnets disposed in the rotor pass by the slots of the stator, the relative positions are shifted in a circumferential direction, thereby causing the positions with a maximum clogging torque generated in each layer to shift in the circumference direction. Furthermore, multistep skewing with division into no less than two steps in the axial direction is also known.

Despite such a reduction of cogging torque based on the rotor shape and stator shape, the cogging torque still remains. The inventors have discovered that magnetic anisotropy of flat rolled magnetic steel sheets and strip constituting the rotor and stator causes the cogging torque. Rotor cores and stator cores used in motors are manufactured from non-directional flat rolled magnetic steel sheets and strip, but even in the non-directional flat rolled magnetic steel sheets and strip magnetization characteristics differ in the direction parallel to the rolling direction and the direction perpendicular to the rolling direction. The inventors have discovered that magnetic anisotropy of flat rolled magnetic steel sheets and strip becomes the cause of the cogging torque.

In Japanese Patent Application Laid-open No. 10-66283 (hereinafter referred to as Patent Document 1), the inventors have suggested measures for eliminating rotation fluctuations caused by magnetic anisotropy in synchronous electric motors. Patent Document 1 is focused on magnetic anisotropy of stacked stators and discloses a method for the manufacture of a stacked stator which reduces torque ripple caused by the magnetic anisotropy in synchronous electric motors.

However, the rotation fluctuations which are the object of elimination in Patent Document 1 represent the torque ripple and are different from the cogging torque. The inventors, to the best of their knowledge, have no references that have to be disclosed with respect to prior art technology aimed at the reduction of cogging torque caused by magnetic anisotropy of flat rolled magnetic steel sheets and strip.

When a core workpiece of flat rolled magnetic steel sheets and strip is punched out with a die and a plurality of cores are stacked by lamination, because the core shapes are arranged in the same direction with respect to the rolling direction, magnetic anisotropy of the core causes the cogging torque. The torque ripple which is the object of elimination in Patent Document 1 represents an effect appearing when an electric current is passed in the motor. By contrast, the cogging torque which is to be eliminated in accordance with the present invention is not related to the electric current flowing in the coil, is determined by the shape of the core or the magnet, and is caused by different factors.

Therefore, the task of eliminating the cogging torque caused by magnetic anisotropy of a motor has not been disclosed in Patent Document 1 and, to the best of the inventors' knowledge, is set for the first time in the present invention.

Methods of skewing or step shifting that have been conventionally used for reducing the cogging torque are designed to reduce the cogging torque caused by the shape factors such as the rotor shape or stator shape. The cogging torque generated by the shape factors has a comparatively large amplitude and the methods comprising skewing or step shifting are effective for reducing such a cogging torque having a large amplitude. However, the cogging torque component caused by magnetic anisotropy is impossible to reduce by such methods.

Furthermore, stacking the cores while rotating them so as to obtain an almost uniform arrangement in the entire stacked core at a pitch of poles, slots, or outer shape can be also considered as means for averaging the scattering of the core thickness or the scattering caused by the core shape associated with die accuracy, but such a uniform arrangement cannot reduce the cogging torque caused by magnetic anisotropy.

SUMMARY OF THE INVENTION

It is an object of the present invention to reduce the cogging torque caused by magnetic anisotropy of rotor or stator cores in a motor.

In accordance with the present invention, the cogging torque caused by magnetic anisotropy is reduced by obtaining different rolling directions in a plurality of cores which are to be stacked, during core manufacture by press forming, and preventing matching of rolling directions in the stacked cores. Turning flat rolled magnetic steel sheets and strip serving as a core workpiece through a prescribed angle or turning a die through a prescribed angle in the course of press forming makes it possible to eliminate the dependence of rotation on the pitch of poles, slots, or outer shape.

The inventors have experimentally discovered that the cogging torque caused by magnetic anisotropy is generated with a period which a natural number multiple of the number of slots and a natural number multiple of the number poles.

Accordingly, based on the characteristic of the generation period of the cogging torque caused by magnetic anisotropy, in the rotation angle of flat rolled magnetic steel sheets and strip or die in the press forming process, the rotor cores are stacked with turning through an angle which is an odd number multiple of about (360°/(number of slots in the motor×natural number n×2)) and the stator cores are stacked with turning through an angle which is an odd number multiple of about (360°/(number of poles in the motor×natural number n×2)). Stacking with turning through the angle which is an odd number multiple causes the phases of cogging torque to cancel each other by the opposite phase and makes it possible to reduce the cogging torque of the motor. When stacking is conducted with turning through an angle which is an even number multiple, the cogging torque phases become in phase and the cogging torque is not cancelled and cannot be reduced.

Further, by conducting experiments, the inventors have discovered that: (1) when a natural number n is selected such that the (number of slots in the motor×natural number n) in the (360°/(number of slots in the motor×natural number n×2)) becomes equal to the number of poles in the motor or close thereto, a large cogging torque is generated with a period of (number of slots in the motor×selected natural number n) on the rotor side of the motor, and (2) when a natural number n is selected such that the (number of poles in the motor×natural number n) in the (360°/(number of poles in the motor×natural number n×2)) becomes equal to the number of slots in the motor or close thereto, a large cogging torque is generated with a period of (number of poles in the motor×selected natural number n) on the stator side of the motor. Accordingly, a large effect in reducing and canceling the cogging torque can be obtained by selecting the natural number defining the prescribed angle of the die or the flat rolled magnetic steel sheets and strip in press forming as a period close to the number of slots or number of poles, based on the characteristic of generation period of the clogging torque caused by magnetic anisotropy on the stator side and rotor side.

The present invention relates to a motor and an apparatus for the manufacture of a motor.

In the first embodiment of the motor in accordance with the present invention, a stacked core is comprised which is formed by stacking a plurality of cores composed of flat rolled magnetic steel sheets and strip, in the stacked core at least one core is considered as a stacking unit, the cores are the rotor cores and stator cores, the stator cores are stacked with turning through an angle which is an odd number multiple of about (360°/(number of poles in the motor×natural number n×2)) for each stacking unit with respect to the rolling direction, and the rotor cores are stacked with turning through an angle which is an odd number multiple of about (360°/(number of slots in the motor×natural number n×2)) for each stacking unit with respect to the rolling direction.

In the motor of the aforesaid embodiment, the value of the aforesaid natural number n can be selected such that the (number of poles in the motor×natural number n) in the (360°/(number of poles in the motor×natural number n×2)) becomes equal to the number of slots in the motor or close thereto, or the value of the aforesaid natural number n can be selected such that the (number of slots in the motor×natural number n) in the (360°/(number of slots in the motor×natural number n×2)) becomes equal to the number of poles in the motor or close thereto.

In the second embodiment of the motor in accordance with the present invention, a stacked core is comprised which is formed by stacking a plurality of cores composed of flat rolled magnetic steel sheets and strip, in the stacked core at least one core is considered as a stacking unit, the cores are the rotor cores and stator cores, the stator cores are stacked by skewing continuously at angles obtained by proportionally dividing an angle range of one period by the number of stacked pieces, where an angle which is a natural number multiple of about (360°/(number of poles in the motor×natural number n)) is the angle range of one period, or at an angle obtained by adding the angle obtained by shifting by an angle which is an integer multiple of one period to those proportionally divided angles, for each stacking unit with respect to the rolling direction, and the rotor cores are stacked by skewing continuously at angles obtained by proportionally dividing an angle range of one period by the number of stacked pieces, where an angle which is a natural number multiple of about (360°/(number of slots in the motor×natural number n)) is the angle range of one period, or at an angle obtained by adding the angle obtained by shifting by an angle which is an integer multiple of one period to those proportionally divided angles, for each stacking unit with respect to the rolling direction.

In the motor of the aforesaid embodiment, the value of the aforesaid natural number n can be selected such that the (number of poles in the motor×natural number n) in the (360°/(number of poles in the motor×natural number n×2)) becomes equal to the number of slots in the motor or close thereto, or the value of the aforesaid natural number n can be selected such that the (number of slots in the motor×natural number n) in the (360°/(number of slots in the motor×natural number n×2)) becomes equal to the number of poles in the motor or close thereto.

In the third embodiment of the motor in accordance with the present invention, a stacked core is comprised which is formed by stacking a plurality of cores composed of flat rolled magnetic steel sheets and strip, in the stacked core at least one core is considered as a stacking unit, the cores are the rotor cores and stator cores, the stator cores are stacked with turning through an angle such that the difference between angles which are odd number multiples of (360°/(number of poles in the motor×natural number [n1, n2, . . . ]×2)), for no less than two natural numbers (n1, n2, . . . ), is within a prescribed angle range, for each stacking unit with respect to the rolling direction of said core, and the rotor cores are stacked with turning through an angle such that the difference between angles which are odd number multiples of (360°/(number of slots in the motor×natural number [m1, m2, . . . ]×2)), for no less than two natural numbers (m1, m2, . . . ), is within a prescribed angle range, for each stacking unit with respect to the rolling direction of said core.

In the motor of the aforesaid embodiment, the values of the aforesaid natural numbers n1 and n2 can be selected such that the (number of poles in the motor×natural numbers [n1, n2]) in the (360°/(number of poles in the motor×natural number [n1, n2]×2)) becomes equal to the number of slots in the motor or close thereto, or the values of the aforesaid natural numbers m1 and m2 can be selected such that the (number of slots in the motor×natural number [m1, m2]) in the (360°/(number of slots in the motor×natural number [m1, m2]×2)) becomes equal to the number of poles in the motor or close thereto.

In the fourth embodiment of the motor in accordance with the present invention, a stacked core is comprised which is formed by stacking a plurality of cores composed of flat rolled magnetic steel sheets and strip, in the stacked core at least one core is considered as a stacking unit, the cores are the rotor cores and stator cores, the stator cores are stacked by skewing continuously at angles obtained by proportionally dividing an angle range of one period by the number of stacked pieces, where an angle such that the difference between angles which are natural number multiples of (360°/(number of poles in the motor×natural number [n1, n2, . . . ])), for no less than two natural numbers (n1, n2, . . . ), is within a prescribed angle range, is the angle range of one period, or at an angle obtained by adding the angle obtained by shifting by an angle which is an integer multiple of the aforesaid one period to those proportionally divided angles, for each stacking unit with respect to the rolling direction of the core, and the rotor cores are stacked by skewing continuously at angles obtained by proportionally dividing an angle range of one period by the number of stacked pieces, where an angle such that the difference between angles which are natural number multiples of (360°/(number of slots in the motor×natural number [m1, m2, . . . ])), for no less than two natural numbers (m1, m2, . . . ), is within a prescribed angle range, is the angle range of one period, or at an angle obtained by adding the angle obtained by shifting by an angle which is an integer multiple of the aforesaid one period to those proportionally divided angles, for each stacking unit with respect to the rolling direction of the core.

In the motor of the aforesaid embodiment, the values of the aforesaid natural numbers n1 and n2 can be selected such that the (number of poles in the motor×natural numbers [n1, n2]) in the (360°/(number of poles in the motor×natural number [n1, n2]×2)) becomes equal to the number of slots in the motor or close thereto, or the values of the aforesaid natural numbers m1 and m2 can be selected such that the (number of slots in the motor× natural number [m1, m2]) in the (360°/(number of slots in the motor×natural number [m1, m2]×2)) becomes equal to the number of poles in the motor or close thereto.

In the motors of the aforesaid embodiments, the angle of the rotor core can be considered as an angle obtained by deducting the angle of the aforesaid core, or the angle through which the core was shifted with other means, and the angle of the stator core can be considered as an angle obtained by deducting the angle of the aforesaid core, or the angle through which the core was shifted with other means. Skewing or step shifting determined by the core shape can be considered as the other means.

One embodiment of the motor manufacturing apparatus for manufacturing a motor equipped with a stacked core in accordance with the present invention comprises punching means comprising a punching die, wherein the punching means forms a plurality of cores with different rolling directions by punching out the flat rolled magnetic steel sheets and strip by turning the flat rolled magnetic steel sheets and strip with respect to the punching die or by turning the punching die with respect to the flat rolled magnetic steel sheets and strip through any angle of the below-described clauses (A1) through (A5) with respect to the rolling direction of the flat rolled magnetic steel sheets and strip:

(A1) an angle 1 which is an odd number multiple of about (360°/(number of poles in the motor×natural number n×2)), and/or an angle 2 which is an odd number multiple of about (360°/(number of slots in the motor×natural number n×2));

(A2) an angle 1 obtained when the value of the natural number n is selected such that the (number of poles in the motor×natural number n) giving the angle 1 in the clause (A1) becomes equal to the number of slots in the motor or close thereto, and/or an angle 2 obtained when the value of the natural number n is selected such that the (number of slots in the motor×natural number n) giving the angle 2 in the clause (A1) becomes equal to the number of poles in the motor or close thereto;

(A3) an angle 1 such that the difference between angles which are odd number multiples of (360°/(number of poles in the motor×natural number [n1, n2, . . . ]×2)), for no less than two natural numbers (n1, n2, . . . ), is within a prescribed angle range; and/or an angle 2 such that the difference between angles which are odd number multiples of (360°/(number of slots in the motor×natural number [m1, m2, . . . ]×2)), for no less than two natural numbers (m1, m2, . . . ), is within a prescribed angle range;

(A4) an angle 1 obtained when the values of the natural numbers n1 and n2 are selected such that the (number of poles in the motor×natural numbers [n1, n2]) giving the angle 1 in the clause (A3) becomes equal to the number of slots in the motor or close thereto, and/or an angle 2 obtained when the values of the natural numbers m1 and m2 are selected such that the (number of slots in the motor×natural number [m1, m2]) giving the angle 2 in the clause (A3) becomes equal to the number of poles in the motor or close thereto; and (A5) an angle 1' (angle 1'=angle 1−angle 2−angle 3) obtained by subtracting the angle 2 and an angle 3 provided by other means from the angle 1, and/or an angle 2' (angle 2'=angle 2−angle 1−angle 3) obtained by subtracting the angle 1 and an angle 3 provided by other means from the angle 2 in each of the clauses (A1) through (A4).

The second embodiment of the motor manufacturing apparatus for manufacturing a motor equipped with a stacked core in accordance with the present invention comprises punching means comprising a punching die, wherein the punching means forms a plurality of cores with different rolling directions by punching out the flat rolled magnetic steel sheets and strip by skewing continuously the flat rolled magnetic steel sheets and strip with respect to the punching die or the punching die with respect to the flat rolled magnetic steel sheets and strip at angles obtained by proportionally dividing an angle range of one period by the number of stacked pieces, where any angle of the below-described clauses (B1) through (B5) is the angle range of one period, or at an angle obtained by adding the angle obtained by shifting by an angle which is an integer multiple of the one period angle to those proportionally divided angles, with respect to the core rolling direction:

(B1) an angle 1 which is a natural number multiple of about (360°/(number of poles in the motor×natural number n)), and/or an angle 2 which is a natural number multiple of about (360°/(number of slots in the motor×natural number n));

(B2) an angle 1 obtained when the value of the natural number n is selected such that the (number of poles in the motor×natural number n) giving the angle 1 in the clause (B1) becomes equal to the number of slots in the motor or close thereto, and/or an angle 2 obtained when the value of the natural number n is selected such that the (number of slots in the motor×natural number n) giving the angle 2 in the clause (B1) becomes equal to the number of poles in the motor or close thereto;

(B3) an angle 1 such that the difference between angles which are natural number multiples of (360°/(number of poles in the motor×natural number [n1, n2, . . . ])), for no less than two natural numbers (n1, n2, . . . ), is within a prescribed angle range; and/or an angle 2 such that the difference between angles which are natural number multiples of (360°/(number of slots in the motor×natural number

[m1, m2, ... ])), for no less than two natural numbers (m1, m2, ... ), is within a prescribed angle range;

(B4) an angle 1 obtained when the values of the natural numbers n1 and n2 are selected such that the (number of poles in the motor×natural numbers [n1, n2]) giving the angle 1 in the clause (B3) becomes equal to the number of slots in the motor or close thereto, and/or an angle 2 obtained when the values of the natural numbers m1 and m2 are selected such that the (number of slots in the motor×natural number [m1, m2]) giving the angle 2 in the clause (B3) becomes equal to the number of poles in the motor or close thereto;

(B5) an angle 1' obtained by subtracting the angle 2 and an angle 3 provided by other means from the angle 1, and/or an angle 2' obtained by subtracting the angle 1 and an angle 3 provided by other means from the angle 2 in each of the clauses (B1) through (B4).

In the above-described first and second embodiment of the motor manufacturing apparatus, it is possible to employ a configuration in which the punching die is a progressive die and comprises a plurality of stations using dies shifted through the prescribed angle, and/or a common station using dies which do not depend on the prescribed angle, or a configuration comprising a station for punching out cores of two types that differ with respect to a rod position and/or outer shape with a small shape repetition, or a configuration comprising a station for rotating the punched-out cores of two types.

In the third embodiment of the motor manufacturing apparatus for manufacturing a motor equipped with a stacked core in accordance with the present invention, the core is formed by using flat rolled magnetic steel sheets and strip which have crystal orientations that differ by an angle of any of the above-described clauses (A1) through (A5) of by half of this angle. When shifting is conducted by half the angle, one core is turned over with respect to the other core and stacked therewith so that the angular difference therebetween becomes equal to the aforesaid angle.

In the fourth embodiment of the motor manufacturing apparatus for manufacturing a motor equipped with a stacked core in accordance with the present invention, the core is formed by using flat rolled magnetic steel sheets and strip which have crystal orientations that differ by angles obtained by proportionally dividing an angle range of one period by the number of stacked pieces, where an angle of any of the above-described clauses (B1) through (B5) or half of this angle is the angle range of one period, or by angles obtained by adding the angle obtained by shifting by an angle which is an integer multiple of the one period angle to those proportionally divided angles. When shifting is conducted by half the angle, one core is turned over with respect to the other core and stacked therewith so that the angular difference therebetween becomes equal to the aforesaid angle.

In the fifth embodiment of the motor manufacturing apparatus for manufacturing a motor equipped with a stacked core in accordance with the present invention, the core is formed by turning flat rolled magnetic steel sheets and strip or a die through an angle of any of the above-described clauses (A1) through (A5) or half of this angle.

In the sixth embodiment of the motor manufacturing apparatus for manufacturing a motor equipped with a stacked core in accordance with the present invention, the core is formed by turning flat rolled magnetic steel sheets and strip or a die by angles obtained by proportionally dividing an angle range of one period by the number of stacked pieces, where an angle of any of the above-described clauses (B1) through (B5) or half of this angle is the angle range of one period, or by angles obtained by adding the angle obtained by shifting by an angle which is an integer multiple of the one period angle to those proportionally divided angles.

In the seventh embodiment of the motor manufacturing apparatus for manufacturing a motor equipped with a stacked core in accordance with the present invention, the core is formed by using dies or progressive dies shifted by half an angle of any of the above-described clauses (A1) through (A5), and one core is turned over with respect to the other core and stacked therewith so that the angular difference therebetween becomes equal to the aforesaid angle.

In the eighth embodiment of the motor manufacturing apparatus for manufacturing a motor equipped with a stacked core in accordance with the present invention, the core is formed by using dies or progressive dies of angles obtained by proportionally dividing an angle range of one period by the number of stacked pieces, where half of an angle of any of the above-described clauses (B1) through (B5) is the angle range of one period, or by angles obtained by adding the angle obtained by shifting by an angle which is an integer multiple of the one period angle to those proportionally divided angles, and one core is turned over with respect to the other core and stacked therewith so that the angular difference therebetween becomes equal to the aforesaid angle.

In the ninth embodiment of the motor manufacturing apparatus for manufacturing a motor equipped with a stacked core in accordance with the present invention, flat rolled magnetic steel sheets and strip shifted by an angle of any of the above-described clauses (A1) through (A5) are inserted in dies or progressive dies, and of the cores formed with the dies or progressive dies, one core is turned over with respect to the other core and stacked therewith so that the angular difference therebetween becomes equal to the aforesaid angle.

In the tenth embodiment of the motor manufacturing apparatus for manufacturing a motor equipped with a stacked core in accordance with the present invention, flat rolled magnetic steel sheets and strip shifted by angles obtained by proportionally dividing an angle range of one period by the number of stacked pieces, where half of an angle of any of the above-described clauses (B1) through (B5) is the angle range of one period, or by angles obtained by adding the angle obtained by shifting by an angle which is an integer multiple of the one period angle to those proportionally divided angles are inserted in dies or progressive dies, and of the cores formed with the dies or progressive dies, one core is turned over with respect to the other core and stacked therewith so that the angular difference therebetween becomes equal to the aforesaid angle.

Combining the step shifting which turns the cores or skewing with the rotation of the cores with respect to the rolling direction makes it possible to reduce both the cogging torque caused by the core shape and the cogging torque caused by magnetic anisotropy. In this case, the prescribed angle is the sum of the angle through which the cores are turned with respect to the rolling direction with the angle of step shifting or skewing the cores based on the shape. As a result, the cogging torque associated with the rotor shape, stator shape, and die accuracy can be reduced and the cogging torque caused by magnetic anisotropy can be also reduced.

As for the turning angle of the stacked core in accordance with the present invention, the angles defined by the above-described formulas include a certain angle range in which the prescribed reduction of cogging torque can be achieved.

Furthermore, in accordance with the present invention, at least two frequency components of the cogging torque generated in one revolution can be reduced at the same time. The turning angle of the cores which reduces the at least two frequency components of the cogging torque can be obtained by finding a turning angle at which the at least two angles obtained by odd number multiplication approach each other by adjusting the multiplication ratio of each odd number multiplication for turning angles corresponding to each frequency component of the cogging torque. Therefore, the turning angle set in this case sometimes becomes shifted by a certain angle from the turning angle corresponding to each frequency component of the cogging torque defined by using the aforesaid formula. The effect of reducing the cogging torque sometimes somewhat varies due to this angle shift, but setting the angle within the angle range in which this variation width becomes within a prescribed range makes it possible to obtain an effect of simultaneously reducing the at least two frequency components of the cogging torque generated in one revolution.

Further, higher efficiency in reduction of frequency component of a cogging torque can be obtained by making the frequency of the aforesaid at least two cogging torques close to the number of slots or the number of poles.

In accordance with the present invention, the cogging torque caused by magnetic anisotropy of the rotor is reduced by providing different angles to the cores in the rotor, and the cogging torque caused by magnetic anisotropy of the stator is reduced by providing different angles to the cores in the stator. Therefore, by contrast with Patent Document 1 that is focused on the torque ripple caused by magnetic anisotropy, the present invention is focused on the cogging torque caused by magnetic anisotropy and differs in the torque characteristic which is associated with the problems to be resolved. In Patent Document 1, the turning angle of the cores which serves to resolve the problem is a least common multiple of the number of poles in the rotor and the number representing magnetic anisotropy, whereas in accordance with the present invention, in the rotor it is the angle determined by the number of slots in the stator, and in the stator it is the angle determined by the number of poles in the rotor. Therefore, the angles are also different.

Within the framework of the technology described in Patent Document 1, the least common multiple of the number representing anisotropy of magnetic characteristics of the stator (the number generated per one revolution of the stator) and the number of poles in the rotor serves as a torque ripple number generated per one revolution of the motor. It was experimentally established that if the period of torque ripple is decreased, the amplitude of ripples is reduced. However, in order to decrease the period of torque ripples, it is necessary to change the number of poles in the rotor, and it is difficult to reduce the torque ripple by changing the number of poles in the rotor. Accordingly, with the technology described in Patent Document 1, the torque ripple was reduced by increasing the number representing anisotropy of magnetic characteristics of the stator.

Furthermore, torque ripple is an effect appearing when an electric current is passed. Factors causing the appearance of ripples include the cogging torque, the disturbance of reverse voltage waveform, and the disturbance of electric current, and the ripples are apparently caused by combination of those factors.

The inventors focused their attention of the fact that cogging torque is caused by magnetic anisotropy, though the cogging torque is also caused by the shape error of rotor and stator, and have experimentally confirmed that the frequency of cogging torque generation per one revolution due to magnetic anisotropy is (the number of poles in the motor×natural number n) or (the number of slots in the motor×natural number n). Therefore, the torque generation frequency per one revolution is different from that relating to the technology described in Patent Document 1 and the reasons for this generation are also different.

Further, in accordance with the present invention, the cogging torque caused by magnetic anisotropy can be improved and the torque ripple caused by this cogging torque can be also reduced by improving the disturbance of magnetic flux distribution in the rotor and stator originating from magnetic anisotropy.

Further, in the motor manufacturing apparatus in accordance with the present invention, a configuration is employed in which the punching die is a progressive die and comprises a plurality of stations using dies shifted through the prescribed angle, and/or a common station using dies which do not depend on the prescribed angle, or a configuration comprising a station for punching out one core with respect to a slot and/or rod hole with a comparatively large number of repetitions, or a configuration comprising a station for punching out cores of two types that differ with respect to a rod position and/or outer shape with a relatively small repetition number, or a configuration comprising a station for rotating the punched-out cores of two types.

When several cores are assembled together and stacked to obtain a block after punching one core in a progressive die, it is necessary to provide stations with dies rotated through the prescribed angle. In the usual method, the number of stations has to be doubled, the total length of the progressive die is increased, and the cores cannot be punched in the presently operating press machines. However, the common station of the above-described configuration reduces the number of stations.

For example, because the inner diameter of the stator which has a shape with a high repetitiveness of the shape per one turn corresponds to a round shape, it can be said that the shape does not change regardless of the rotation through any angle, and the repetitiveness is higher. Because the number of slots is usually large and the repetitiveness is high, a common station can be used in the punching station stator for slots. Additional stations are necessary for caulking, rods, and punching the outer shape, but when the outer shape is in the form of a circular arc, the station can be combined in a common station. Here, the prescribed angle can be the angle of (360°/(number of poles×natural number×2)) or the angle of (360°/(number of slots×natural number×2)).

Further, by providing a station for rotating cores it is possible to arrange the outer shape or rod position of the core rotated through the prescribed angle and the usual core by shifting the core in the reverse direction through the prescribed angle.

Furthermore, the orientation of crystals in the flat rolled magnetic steel sheets and strip is the main cause for magnetic anisotropy. Combining the flat rolled magnetic steel sheets and strip manufactured by rotating the orientation of crystals through the prescribed angle and the flat rolled magnetic steel sheets and strip that were manufactured without such rotation makes it possible to use a common die and to eliminate the cogging torque caused by magnetic anisotropy. Furthermore, this prescribed angle is selected as the angle which is half the conventional angle, mating the surface core and the core obtained by turning it over becomes mating the cores shifted through the prescribed angle, and the prescribed angle shift is formed.

A die is produced in which the shape of the rotors or stators is shifted by half of the prescribed angle with respect to the rolling direction, and the cores manufactured with this die are combined with the cores obtained by turning such cores over. The angular difference between the two becomes the prescribed angle.

When the shape of the rotors or stators is punched with the die, the cores are punched by inserting flat rolled magnetic steel sheets and strip with a shift of half the prescribed angle with respect to the rolling direction, the cores thus manufactured are combined with the cores obtained by turning such cores over and the angular difference between the two is considered as the prescribed angle.

Further, in accordance with the present invention, when an angular shift through the prescribed angle is formed in the core, dies shifted by the prescribed angle are used or punching is conducted by shifting the flat rolled magnetic steel sheets and strip through the prescribed angle. In other respects, a plurality of cores are formed at an angle which is half the prescribed angle, and some cores are turned over and combined with the other cores, thereby matching the angular shifts of the two and obtaining the angular shift through the prescribed angle. Furthermore, in another possible mode, when the shape of the rotors or stators is punched with the die, the cores are punched by inserting flat rolled magnetic steel sheets and strip with a shift of half the prescribed angle with respect to the rolling direction, the cores manufactured by such a method are combined with the cores obtained by turning such cores over, with the result that the angular difference between the two becomes the prescribed angle. As a result, the number of dies can be reduced.

In the motor manufacturing apparatus, a configuration can be also used in which a die is produced that shifts the shape of the rotors or stators by half the prescribed angle with respect to the rolling direction, the cores manufactured with this die are combined with the cores obtained by turning such cores over, with the result that the angular difference between the two becomes the prescribed angle.

The present invention makes it possible to reduce the cogging torque caused by magnetic anisotropy of the rotor or stator cores in the motor.

BRIEF DESCRIPTION OF THE DRAWINGS

FIG. 1 illustrates an example of a configuration of the motor in accordance with the present invention;

FIGS. 7 illustrates an example of stator configuration;

FIGS. 11A through 11D illustrate how an odd number multiple of the shift angle of the cores is obtained;

FIG. 12A through 12E illustrate the fabrication of the cores with continuous skewing;

FIG. 13A through 13E illustrate the fabrication of the cores with continuous skewing;

FIG. 14 illustrates the fabrication of the cores with continuous skewing;

FIG. 15 illustrates the fabrication of the cores with continuous skewing;.

FIGS. 17A and 17B illustrate the second embodiment of fabricating the cores with different rolling directions;

FIGS. 18A and 18B illustrate the third embodiment of fabricating the cores with different rolling directions;

DESCRIPTION OF THE PREFERRED EMBODIMENTS

Figures 2A, 2B:
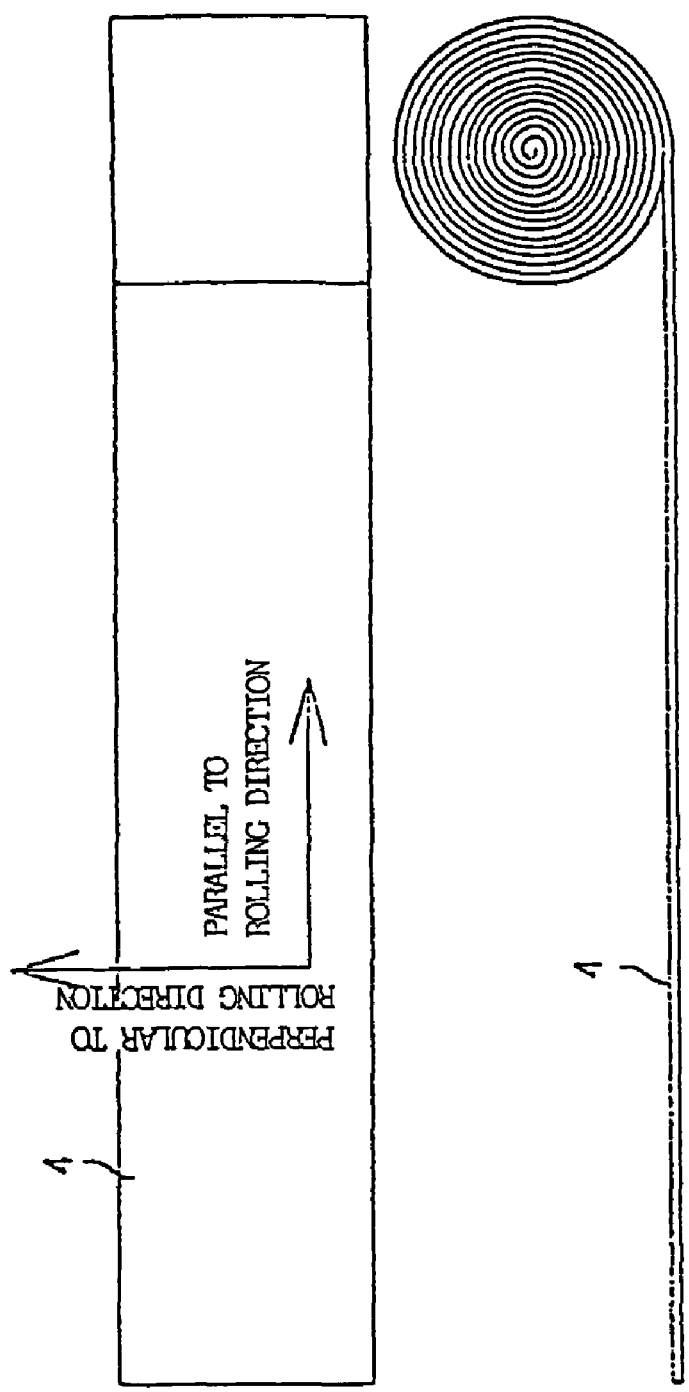
FIGS. 2A and 2B illustrate the rolling direction of flat rolled magnetic steel sheets and strip (hoop)

The preferred embodiments of the present invention will be described hereinbelow in detail with reference to the appended drawings.

FIG. 1 illustrates an example of the structure of the motor in accordance with the present invention. The motor shown in FIG. 1 comprises a rotor 1 and stator 2. The rotor 1 and a stator 2 are formed from stacked materials obtained by stacking the cores composed of flat rolled magnetic steel sheets and strip.

The rotor 1 is prepared by stacking a plurality of rotor cores 1a. An open portion for inserting a shaft 3 serving as a rotary shaft of the motor is formed in the center of each rotor core 1a. Holes 1b for magnets are disposed with an equal angular spacing on a circumference of the rotor cores, the number of those holes corresponding to the number of poles in the motor. Permanent magnets are embedded in the holes 1b for magnets. Caulked portions 1e are formed in the rotor cores 1a for securing the stacked cores.

The stator 2 is prepared by stacking a plurality of stator cores 2a. An open portion for disposing the rotor 1 is formed in the center of each stator core 2a. A plurality of slots 2b for winding a coil are disposed with an equal angular spacing in a circumference of the stator cores. Caulked portions 2c are formed in the stator cores 2a for securing the stacked cores. Furthermore, stator fixing holes 2d are provided for fixing the stator. FIG. 1 illustrates an example of a motor with 8 poles and 24 slots. The rotor 1 comprises 8 poles disposed with an equal angular spacing, and a permanent magnet is disposed in each pole portion. The stator 2 comprises 24 slots disposed with an equal angular spacing.

The rotor cores 1a and stator cores 2a are formed by punching out flat rolled magnetic steel sheets and strip (hoop material) 4. FIGS. 2A and 2B illustrate the rolling direction of the silicon steel sheet (hoop material). Referring to FIGS. 2A and 2B, the longitudinal direction (feed direction) of the coiled flat rolled magnetic steel sheet and strip (hoop material) is parallel to the rolling direction, and the transverse direction of the flat rolled magnetic steel sheet and strip (hoop material) is perpendicular to the rolling direction.

Figure 3:
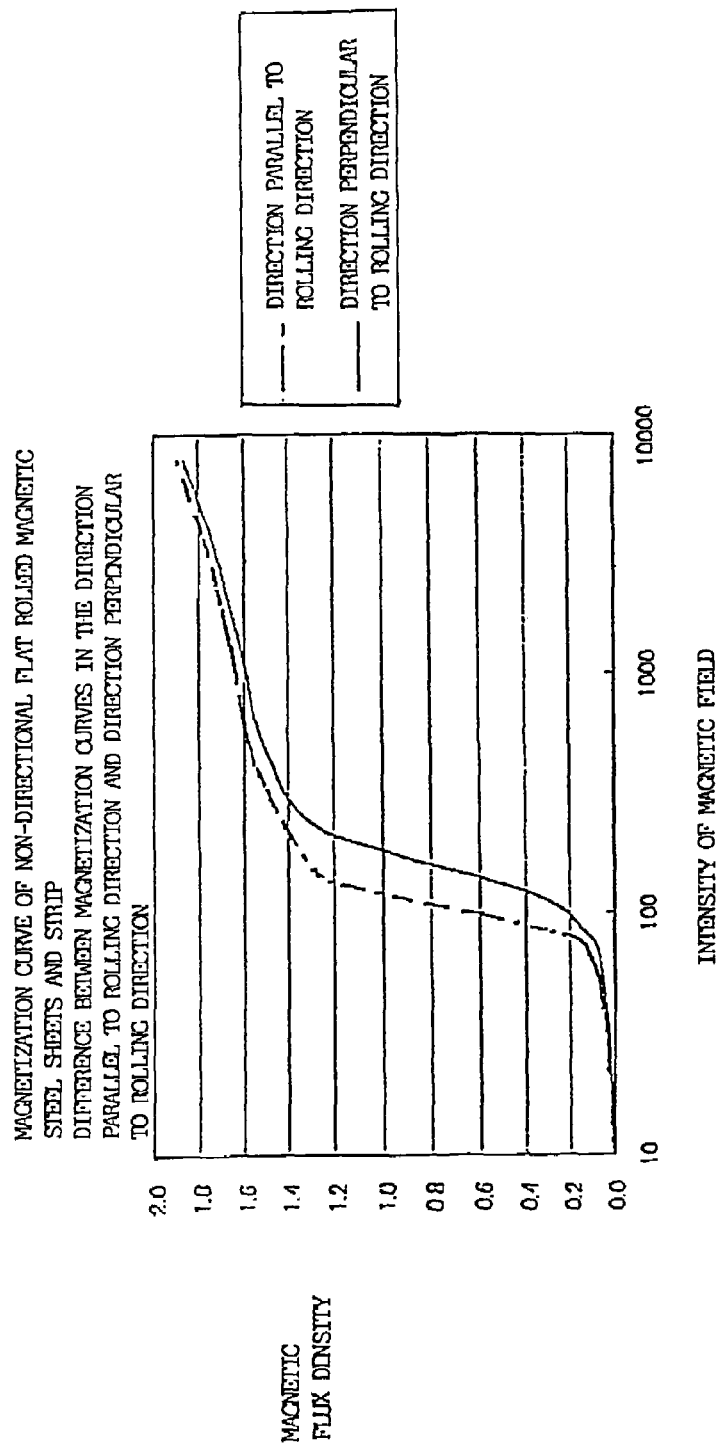
FIG. 3 illustrates a magnetization curve of non-directional flat rolled magnetic steel sheets and strip.

Even in a non-directional flat rolled magnetic steel sheet and strip, the magnetization characteristic differs depending on the rolling direction (has magnetic anisotropy). FIG. 3 shows a magnetization curve of non-directional flat rolled magnetic steel sheets and strip. A broken line in the figure represents a magnetization curve in the direction parallel to the rolling direction, and the solid line in the figure represents a magnetization curve in the direction perpendicular to the rolling direction. As shown in FIG. 3, the characteristic representing the dependence on the magnetic flux density on the magnetic field intensity differs depending on the rolling direction. Therefore, the generated magnetic flux density will differ depending on the rolling direction. As a result, the torque generated in the rotor will also differ causing a cogging torque.

In accordance with the present invention, when the rotor cores and stator cores of the motor are manufactured by press forming, the rolling directions of a plurality of cores which are to be stacked are caused to be different. As a result, selecting non-matching rolling directions of stacked cores reduces the cogging torque caused by magnetic anisotropy. In order to cause the rolling directions of a plurality of cores which are to be stacked to be different in the press forming process, the flat rolled magnetic steel sheets and strip which serves as a core workpiece or a die is turned through a prescribed angle. This turning can be carried out regardless of the pitch of poles, slots, or the outer shape.

The inventors have experimentally discovered that the cogging torque caused by magnetic anisotropy has a period which is a natural number multiple of the number of slots and a natural number multiple of the number of poles. Because the period of the cogging torque is a natural number multiple of the number of slots and a natural number multiple of the number of poles, when the flat rolled magnetic steel sheets and strip or die is turned in the course of press forming, the cores are stacked with turning through an angle which is an odd number multiple of about (360°/(number of poles in the motor×natural number n×2)) or through an angle which is an odd number multiple of about (360°/(number of slots in the motor×natural number n×2)) with respect to the rolling direction of the cores, where at least one core serves as a stacking unit in the stacked cores.

The rotor cores are stacked with turning through an angle which is an odd number multiple of about (360°/(number of slots in the motor×natural number n×2)), and the stator cores are stacked upon turning through an angle which is an odd number multiple of about (360°/(number of poles in the motor×natural number n×2)).

The angle (360°/(number of slots in the motor×natural number n)) corresponds to one period of the cogging torque which is associated with magnetic anisotropy of the rotor and the number of slots in the motor, and the angle (360°/(number of poles in the motor×natural number n)) corresponds to one period of the cogging torque which is associated with magnetic anisotropy of the stator and the number of poles in the motor. Further, dividing this angle by "2" makes it possible to obtain an angle corresponding to a half-wavelength of one period.

Here, stacking with turning through an angle which is an odd number multiple of the aforesaid angle sets the phases of the cogging torque as mutually opposite phases, thereby canceling and reducing the cogging torque. When stacking is conducted with turning through an angle which is an even number multiple, the cogging torque phases become in phase and the cogging torque is not cancelled and cannot be reduced.

Further, the experiments demonstrated that: (1) on the stator side, a cogging torque is largely generated at a period of (number of poles in the motor×natural number n) when the value of the natural number n is selected such that the (number of poles in the motor×natural number n) becomes equal to the number of slots in the motor or close thereto, or on the rotor side, a cogging torque is largely generated at a period of (number of slots in the motor×natural number n) when the value of the natural number n is selected such that the (number of slots in the motor×natural number n) becomes equal to the number of poles in the motor or close thereto.

The table below illustrates an example of such results

| Number of poles | Number of slots | Period and natural number n on the stator side | Period and natural number n on the rotor side |
|---|---|---|---|
| 10 | 12 | 10<br>n = 1<br>20<br>n = 2 | 12<br>n = 1 |
| 8 | 24 | 24<br>n = 3 | 24<br>n = 1 |
| 8 | 36 | 32<br>n = 4<br>40<br>n = 5 | 36<br>n = 1 |

The example shown in the table above demonstrates that, for example, when the number of poles is 10 and the number of slots is 12, on the stator side, a cogging torque is generated with a period of 10 (1 is selected as the natural number n) or 20 (2 is selected as the natural number n) per one turn, and on the rotor side, a cogging torque is generated with a period of 12 (1 is selected as the natural number n). Further, when the number of poles is 8 and the number of slots is 24, on the stator side, a cogging torque is generated with a period of 24 (3 is selected as the natural number n) per one turn, and on the rotor side, a cogging torque is generated with a period of 24 (1 is selected as the natural number n). Moreover, when the number of poles is 8 and the number of slots is 36, on the stator side, a cogging torque is generated with a period of 32 (4 is selected as the natural number n) or 40 (5 is selected as the natural number n) per one turn, and on the rotor side, a cogging torque is generated with a period of 36 (1 is selected as the natural number n).

Accordingly, based on the characteristic of the generation period of the cogging torque caused by magnetic anisotropy on the stator side and rotor side, the stator cores are stacked with turning through an angle which is an odd number multiple of about (360°/(number of poles in the motor×natural number n×2)) upon selecting the natural number n such that the (number of poles in the motor×natural number n) becomes equal to the number of slots in the motor or close thereto, for each stacking unit with respect to the rolling direction, wherein the stacked core has at least one core as a stacking unit. Further, the rotor cores are stacked with turning through an angle which is an odd number multiple of about (360°/(number of slots in the motor×natural number n×2)) upon selecting the natural number n such that the (number of slots in the motor×natural number n) becomes equal to the number of poles or close thereto.

As a result, the natural number determining the prescribed angle of flat rolled magnetic steel sheets and strip or dies in press processing is set to a period close to the number of slots or number of poles, thereby making it possible to obtain a significant effect in reducing and canceling the cogging torque.

Figure 4:
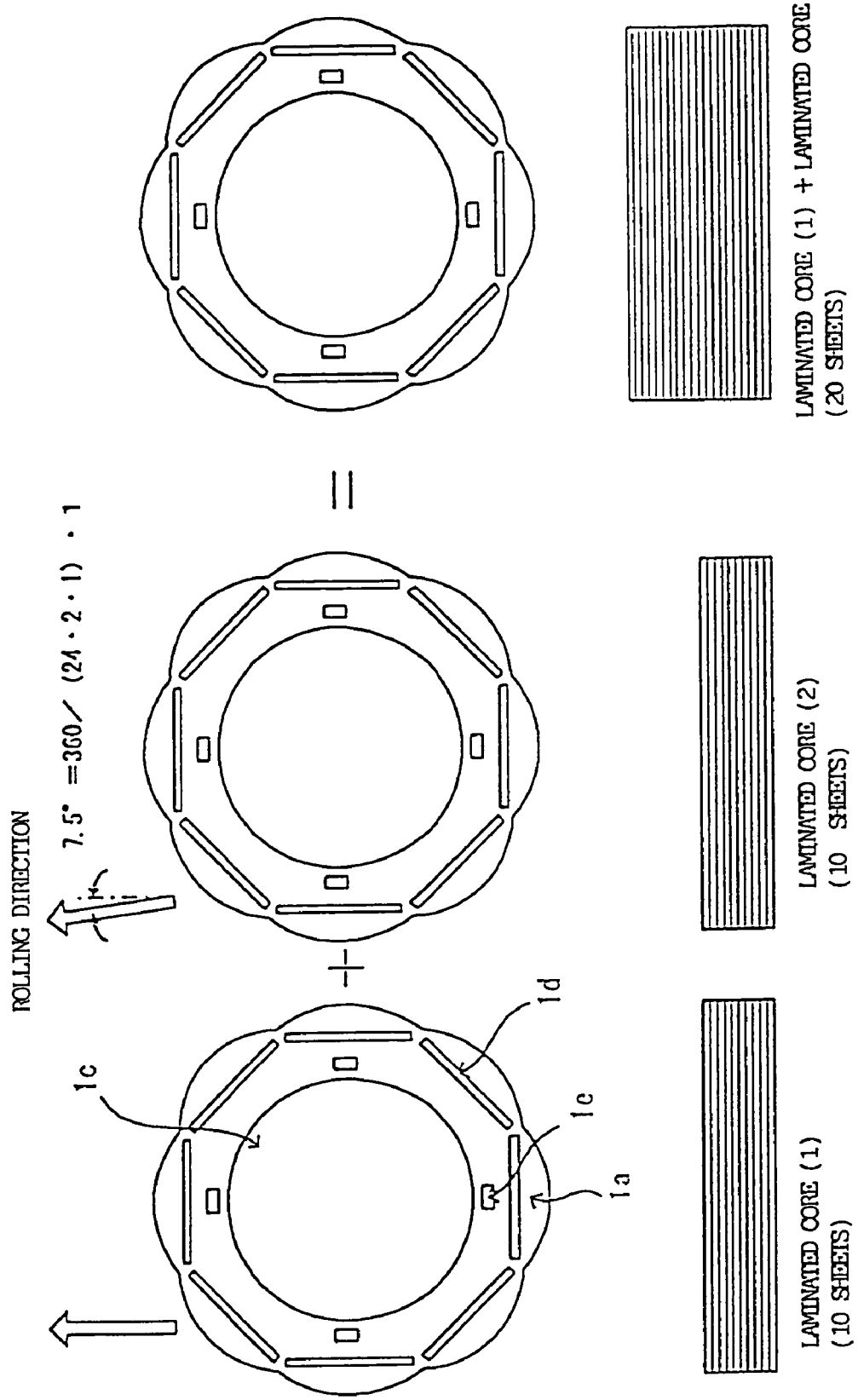
FIG. 4 illustrates an example of rotor configuration.

FIG. 4 is an example of rotor configuration. In this example, a rotor is obtained from a total of 20 stacked cores obtained by stacking the stacked core (1) and stacked core (2) each being produced by stacking 10 rotor cores 1a.

The stacked core (1) and the stacked core (2) are shifted each other through the prescribed angle with respect to the rolling direction (shown by an arrow in the figure). This angle is set by an angle which is an odd number multiple of about (360°/(number of slots in the motor×natural number n×2)). Here, if the number of slots in the motor is "24", the natural number n is "1", and the odd number multiple is 1×, the angle is 7.5°.

Figure 5:
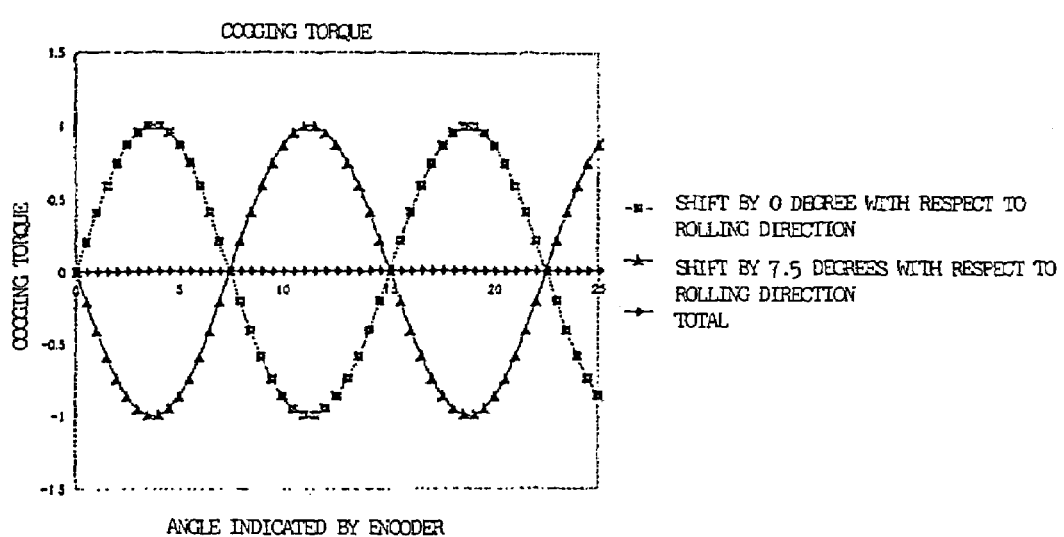
FIG. 5 illustrates the reduction of cogging torque.

FIG. 5 illustrates the reduction of the cogging torque. A cogging torque shifted through of 0° with respect to the rolling direction and a cogging torque shifted through of 7.5° with respect to the rolling direction become in opposite phases. Therefore, combining the two cogging torques reduces the total cogging torque.

Figure 6A:
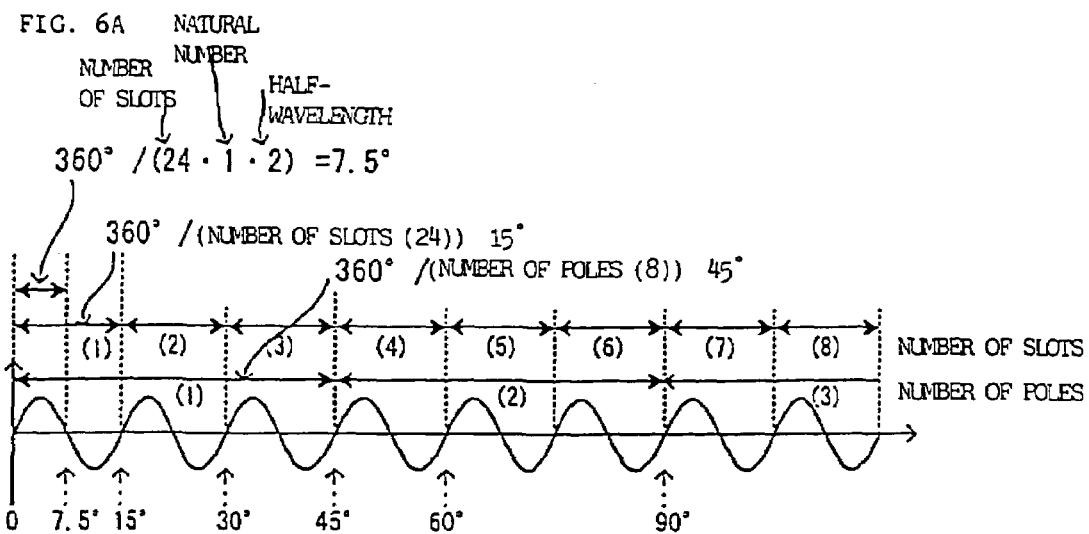
FIGS. 6A through 6D illustrate the cogging torque of a rotor.
Figure 6B:
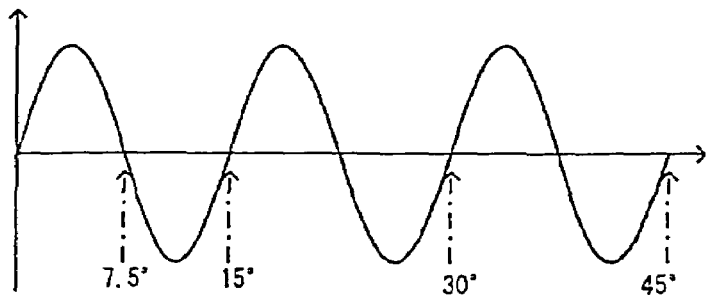
Figure 6C:
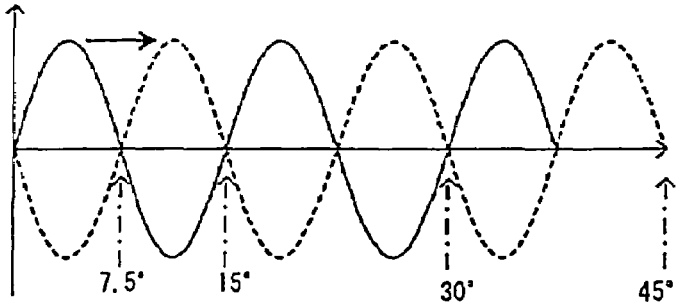
Figure 6D:
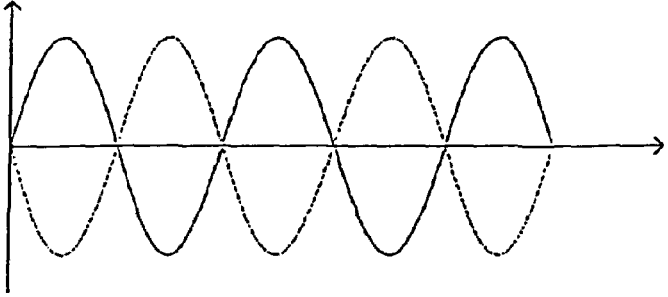

FIGS. 6A through 6D illustrate the cogging torque of a rotor. As shown in FIG. 6A, the cogging torque period is represented by (360°/(number of slots in the motor×natural number n)), and if the number of slots is "24" and the natural number n is "1", one period becomes 15° and a half-wavelength angle is 7.5°. FIGS. 6B through 6D show only three period sections. If a cogging torque (shown by a broken line) shifted through a phase of half-wavelength is generated, as shown in FIG. 6C, and combined with the cogging torque shown in FIG. 6B, the cogging torques with mutually opposite phases eliminate each other, as shown in FIG. 6D, and the total cogging torque is reduced.

FIG. 7 is an example of stator configuration. In this example, a stator is obtained from a total of 20 stacked stator cores obtained by laminating a stacked stator core (1) and a stacked stator core (2) each being produced by stacking 10 stator cores 2a.

The stacked stator core (1) and the stacked stator core (2) are shifted each other through the prescribed angle with respect to the rolling direction (shown by an arrow in the figure). This angle is set by an angle which is an odd number multiple of about (360°/(number of poles×natural number n×2)). Here, if the number of poles in the motor is "8", the natural number n is "1", and the odd number multiple is 1×, the angle is 22.5°.

Figure 8A:
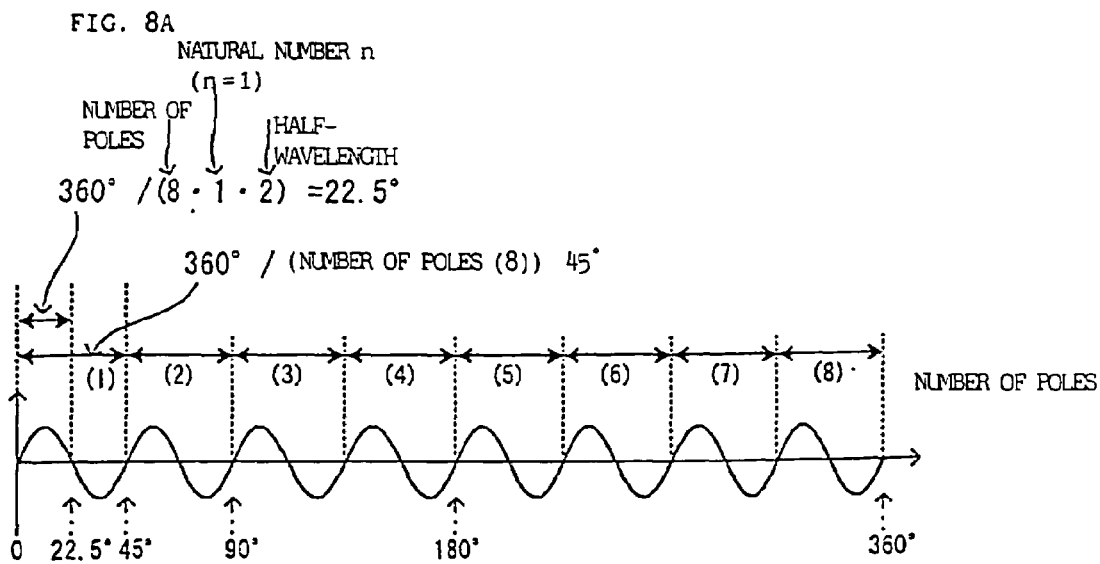
FIGS. 8A through 8D illustrate the cogging torque of a stator.
Figure 8B:
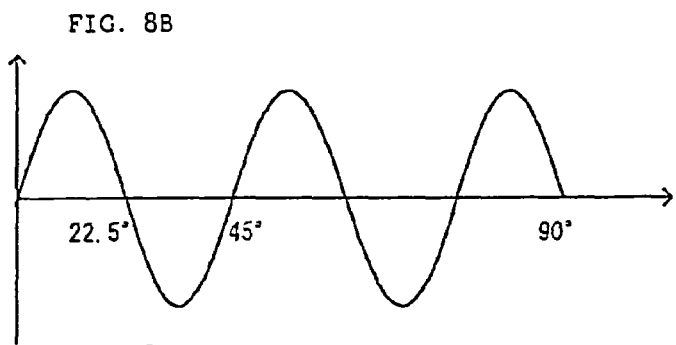
Figure 8C:
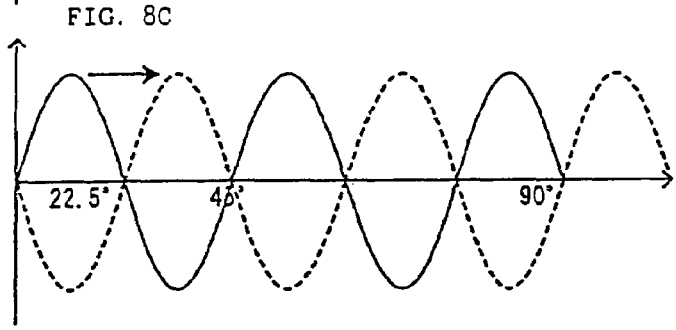
Figure 8D:
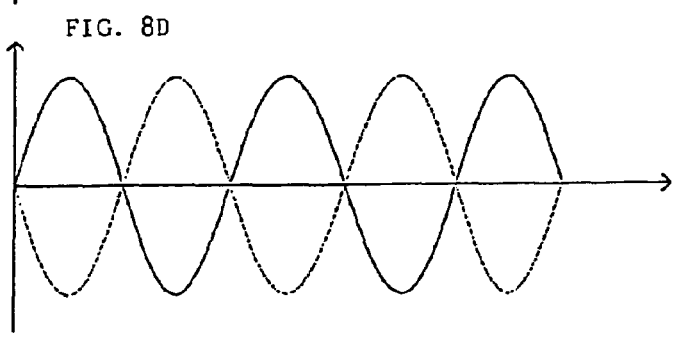

FIGS. 8A through 8D illustrate the cogging torque of a stator. As shown in FIG. 8A, the cogging torque period is represented by (360°/(number of poles in the motor×natural number n)), and if the number of poles is "8" and the natural number n is "1", one period becomes 45° and a half-wavelength angle is 22.5°. FIGS. 8B through 8D show only three period sections. If a cogging torque (shown by a broken line) shifted through a phase of half-wavelength is generated, as shown in FIG. 8C, and combined with the cogging torque shown in FIG. 8B, the cogging torques with mutually opposite phases eliminate each other, as shown in FIG. 8D, and the total cogging torque is reduced.

Figure 9A:
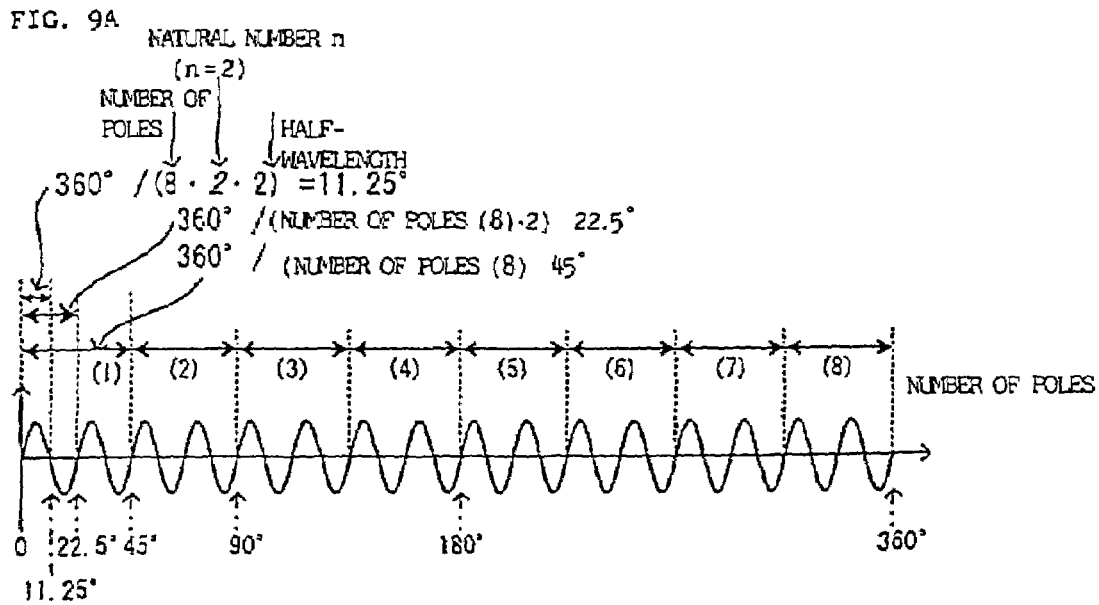
FIGS. 9A through 9D illustrate the cogging torque in the case in which the natural number n is "2"
Figure 9B:
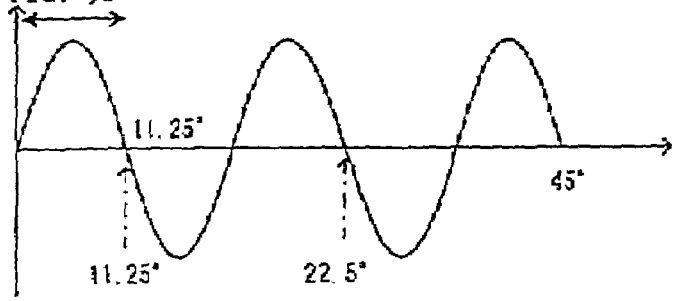
Figure 9C:
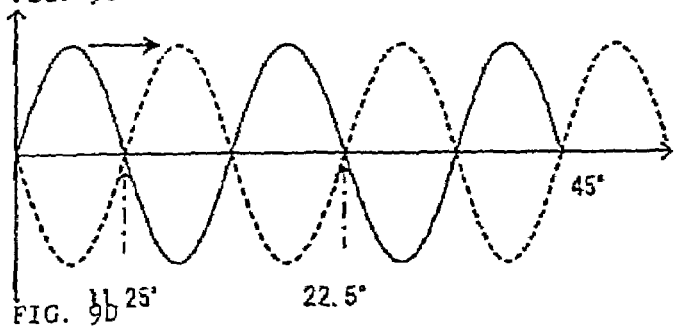
Figure 9D:
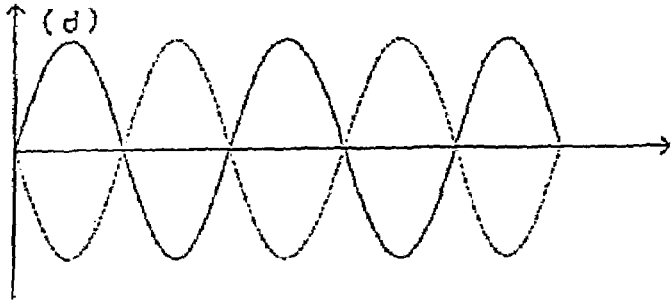

The cogging torque period is proportional to the natural number n. This state will be explained with the cogging torque of a stator as an example. FIGS. 9A through 9D illustrate a cogging torque in the case where the natural number n is "2". In this case, one period corresponds to an angle of 22.5°, and an angle of 11.25° is a half-wavelength section. Therefore, in this case, if a cogging torque (shown by a broken line) shifted through a phase of half-wavelength of 11.25° is generated, as shown in FIG. 9C, and combined with the cogging torque shown in FIG. 9B, the cogging torques with mutually opposite phases eliminate each other, as shown in FIG. 9D, and the total cogging torque is reduced.

Figure 10A:
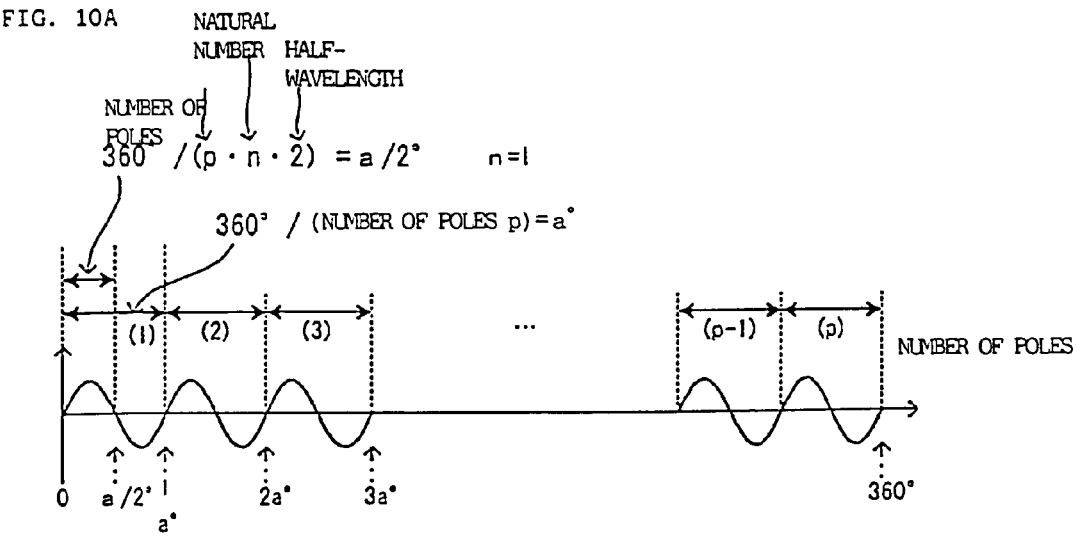
FIGS. 10A through 10C illustrate the relationship between the natural number n and the period of cogging torque.
Figure 10B:
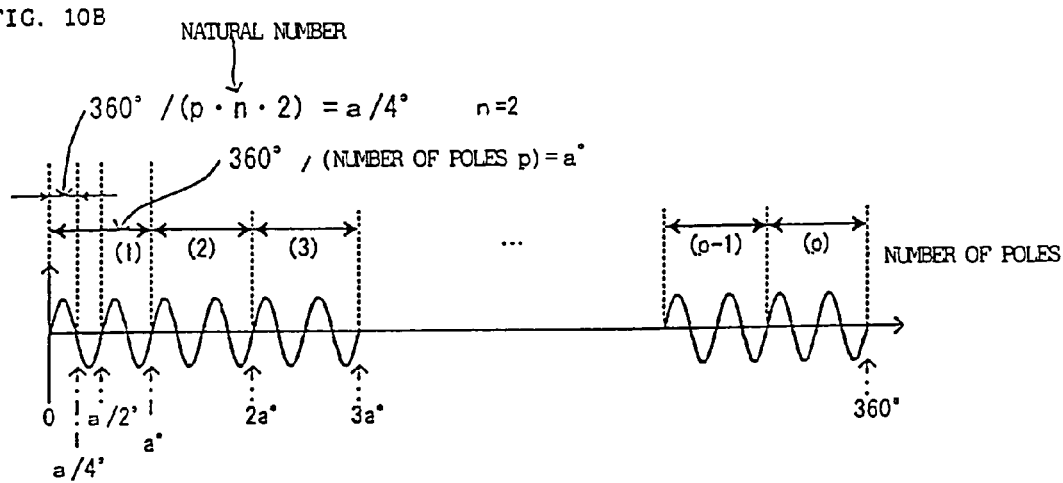
Figure 10C:
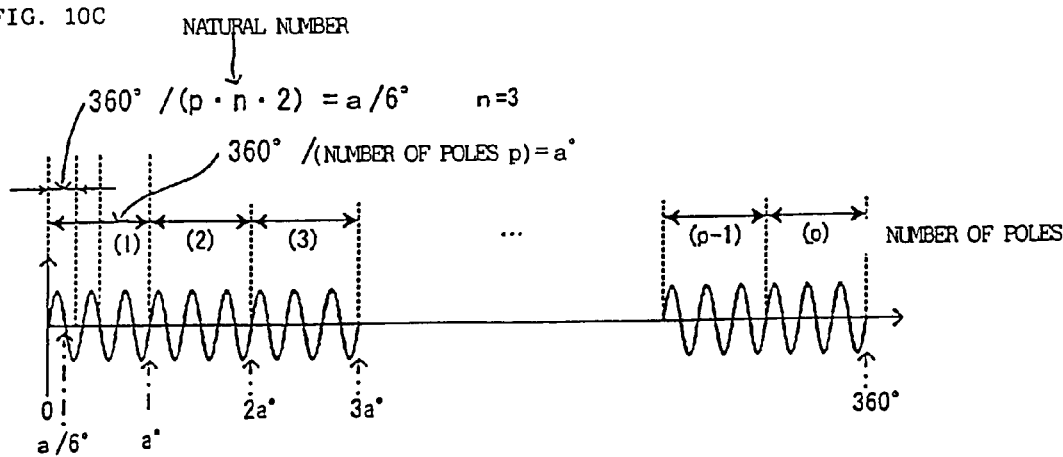

FIGS. 10A through 10C show the relation between the natural number n and the cogging torque period. FIG. 10A illustrates the case in which the natural number n is "1", FIG. 10B illustrates the case in which the natural number n is "2", and FIG. 10C illustrates the case in which the natural number n is "3". Here, the cogging torque generated by the stator core is shown.

FIGS. 11A through 11D illustrate how odd number multiples of core shift angles are obtained. Shifting by an odd number multiple of half-wavelengths with respect to the cogging torque with a period shown in FIG. 11A makes it possible to form a cogging torque with an opposite phase. FIG. 11B illustrates an example with an odd number multiple being "1" and FIG. 11C illustrates an example with an odd number multiple being "3". In the case of shifting by an odd number multiple of half-wavelengths, because the shifted phase becomes in phase, it is always in an opposite phase relation with the cogging torque which is the object of reduction, as shown in FIG. 11D, and when the two waves are combined, they cancel and reduce each other.

On the other hand, in the case of shifting by an even number multiple of half-wavelengths, the shifted phase is in an in-phase relation with the cogging torque which is the object of reduction and when the two waves are combined, they intensify rather than cancel each other.

The embodiment described hereinbelow relates to a configuration in which the above-described shift angle is considered as an angle range of one period and stacking is carried out by continuously skewing at an angle obtained by proportionally dividing this angle range by the number of stacked pieces.

The explanation is provided hereinbelow by using FIGS. 12A through 12E and 13A through 13E, rotor cores being considered as an example.

When cores are produced by continuous skewing, in the case of rotor cores, an angle which is a natural number multiple of about (360°/(number of slots×natural number n)) is selected as an angle range of one period and stacking is carried out with continuously skewing at an angle obtained by proportionally dividing this angle range by the number of stacked pieces.

FIGS. 12A through 12E illustrate the case in which the angle of 15° which is a natural number multiple (=1) of (360°/(number of slots×natural number n)) obtained with a number of slots of "24" and a natural number n of "1" was considered as an angle range of one period and this angle range was proportionally divided by the prescribed number. Here, rotor cores were formed by turning through an angle of 3° as a unit, this angle being obtained by dividing a period of 15° into 5 equal portions, and the rotor cores were continuously skewed and stacked. The figure shows the examples of cores turned through an angle of 0°, 3°, 6°, 9°, and 12°. FIGS. 13A through 13E illustrate the cogging torques observed when those rotor cores were continuously skewed and stacked. FIGS. 13A through 13E show the cogging torques of the cores with respective rotation angles of 0°, 3°, 6°, 9°, and 12°.

Furthermore, a configuration can be also employed in which stacking is conducted with continuous skewing at an angle obtained by adding an angle obtained by shifting through an integer multiple of the angle of one period to the aforesaid proportionally divided angle.

Explanation will be provided hereinbelow by using FIGS. 14 and 15, with a rotor core as an example.

In the case of rotor cores, stacking is conducted with continuous skewing at an angle obtained by shifting an angle which is an integer multiple of one period to the angle obtained by proportionally dividing an angle range of one period by the number of stacked pieces, the angle range of one period being an angle which is a natural number multiple of about (360°/(number of slots×natural number n)).

FIG. 14 illustrates the case in which rotor cores were formed that were turned through the angles of 0°, 18°, 36°, 9°, and 27° obtained by adding the angles 0°, 15°, 30°, 0°, 15° obtained by shifting through an angle which is an integer multiple of one period to the angles of 0°, 3°, 6°, 9°, and 12° obtained by considering the angle of 15°, which is a natural number multiple (=1) of (360°/(number of slots×natural number n)) where the number of slots is "24" and the natural number n is "1", as an angle range of one period and proportionally dividing this angle range by the prescribed number (here, the division was made into 5 equal portion). Those cores were continuously skewed and stacked.

FIG. 15 illustrates the cogging torque obtained when those rotor cores were continuously skewed and stacked. FIGS. 15(*a*) through 15(*e*) show the cogging torques of cores with respective turning angles of 0°, 18°, 36°, 9°, and 27°.

A similar procedure can be also implemented with respect to the stator cores and the stator cores can be formed by stacking with continuous skewing at an angle obtained by proportionally dividing an angle range of one period by the number of stacked pieces, where an angle which is a natural number multiple of about (360°/(number of poles in the motor×natural number n)) is the angle range of one period, or at an angle obtained by adding the angle obtained by shifting by an angle which is an integer multiple of one period to this proportionally divided angle.

The process for fabricating the cores by punching out from a core workpiece will be described below.

In accordance with the present invention, a plurality of cores are formed with different rolling directions with punching means.

In the first embodiment of fabricating the cores with different rolling directions, flat rolled magnetic steel sheet and strip which is a core workpiece is punched out by turning through the prescribed angle with respect to the punching die. The motor manufacturing apparatus turns the core workpiece with a feed mechanism located inside the die and forms the cores in which the rolling directions are shifted by the prescribed angle with the punching die.

Figures 16A, 16B:
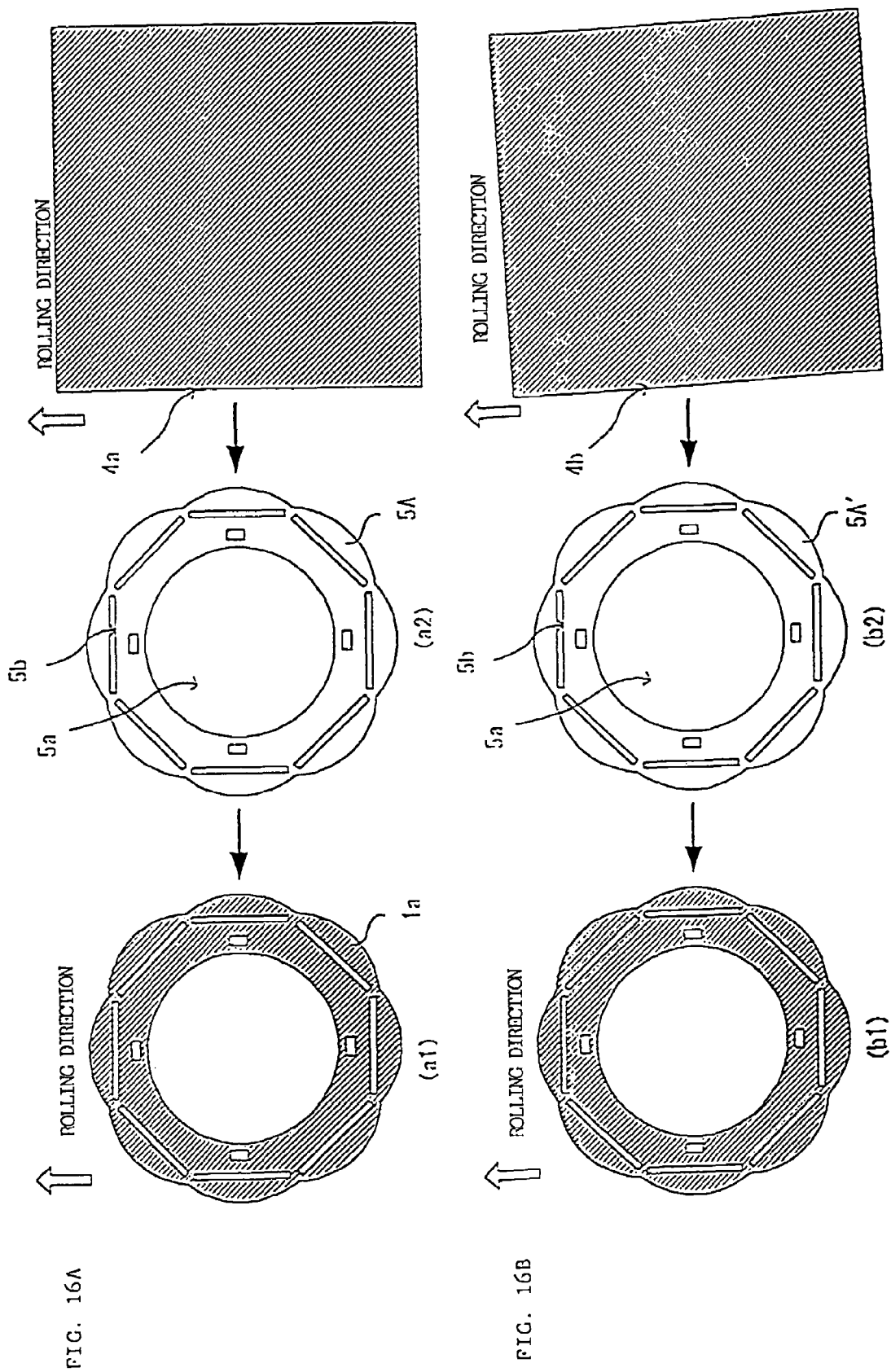
FIGS. 16A and 16B illustrate the first embodiment of fabricating the cores with different rolling directions.

FIGS. 16A and 16B illustrate the first embodiment of fabricating the cores. Referring to FIG. 16A, a core is punched out with a punching die after the rolling direction of the core workpiece has been matched with the prescribed direction (prescribed angle) with respect to the punching die. In FIG. 16A, the reference symbol 5A in figure (a2) represents a punching die. After the core 1*a* has been punched out with the punching die 5A, the core workpiece is turned through the prescribed angle with the feed mechanism located in the die, as shown in FIG. 16B, and the core is punched out with the punching die, without matching the rolling direction. The punching die 5A' shown in figure (b2) in FIG. 16B is identical to the punching die 5A. The motor manufacturing apparatus comprises punching means for punching out the core workpiece with turning the core workpiece through the prescribed angle in the feed mechanism.

In the second embodiment of fabricating the cores with different rolling direction, punching is conducted by turning the punching die through the prescribed angle with respect to the rolling direction of the flat rolled magnetic steel sheets and strip which is the core workpiece. In the motor manufacturing apparatus, the punching die is turned by the feed mechanism located in the die and the cores are formed with a rolling direction shifted by the prescribed angle by the punching die.

FIGS. 17A and 17B illustrate the second embodiment of fabricating the cores. Referring to FIG. 17A, a core is punched out with a punching die after the punching die has been matched with the prescribed direction (prescribed angle) with respect to the rolling direction of the core workpiece. In FIG. 17A, the reference symbol 5A in figure (a2) represents a punching die. After the core 1*a* has been punched out with the punching die 5A, the punching die is turned through the prescribed angle with the feed mechanism located in the die, as shown in FIG. 17B, and the core is punched out with the punching die, without matching the rolling direction. The punching die 5A' shown in figure (b2) in FIG. 17B is identical to the punching die 5A. The motor manufacturing apparatus comprises punching means for punching out the core workpiece with turning the die through the prescribed angle in the feed mechanism.

In the third embodiment of fabricating the cores with different rolling directions, a plurality of punching dies are prepared, those dies having different angles with respect to the rolling direction of the flat rolled magnetic steel sheets and strip which is the core workpiece, and the cores with different angles are punched out with those dies. The motor manufacturing apparatus comprises a plurality of punching dies with different angles with respect to the rolled steel.

FIGS. 18A and 18B illustrate the third embodiment of fabricating the cores. Referring to FIG. 18A, a core is punched out with a punching die after the punching die has been matched with the prescribed direction (prescribed angle) with respect to the rolling direction of the core workpiece. In FIGS. 18A and 18B, the reference symbols 5A and 5B in figures (a2) and (b2) represent punching dies. The punching dies 5A and 5B punch out respective cores 1*a* and form cores 1*a* which are shifted by the prescribed angle with respect to the rolling direction.

Further, in the fabrication of cores, a configuration can be also obtained in which the cores formed by shifting through an angle that is half the prescribed angle are assembled.

Figure 19:
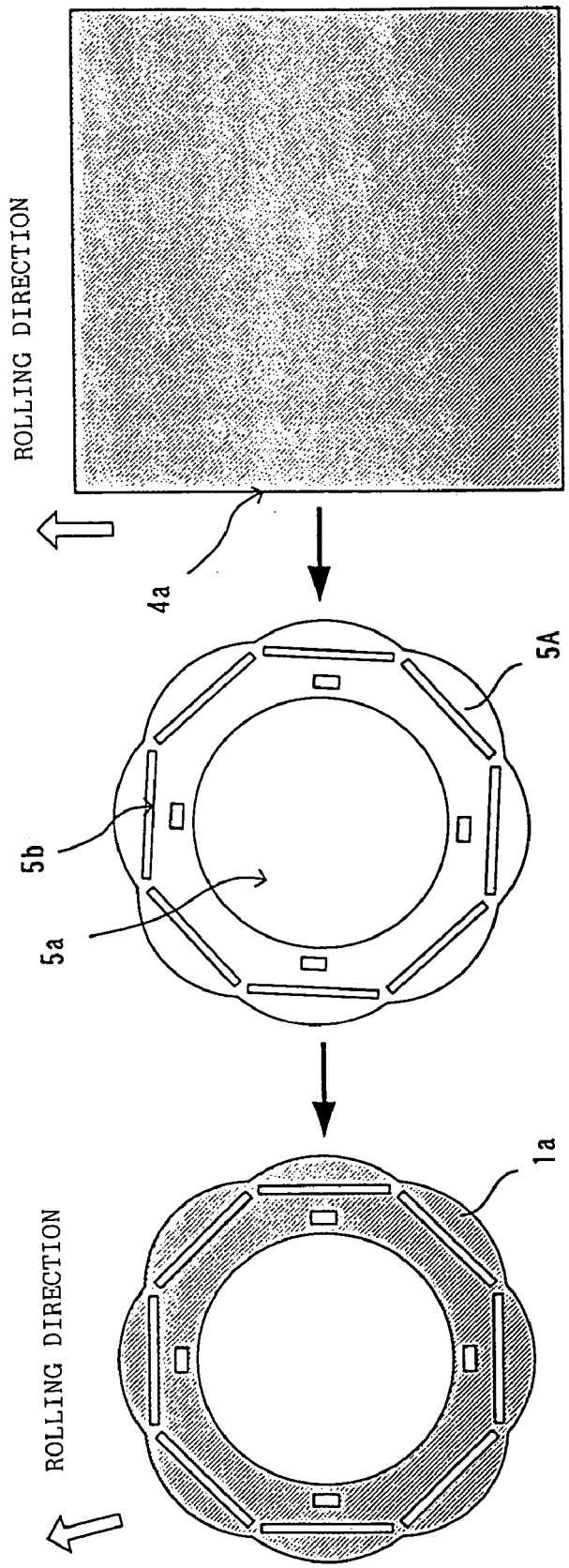
FIG. 19 is a drawing illustrating the first embodiment of fabricating cores with an angle shift which is half the prescribed angle.

FIG. 19 illustrates the first embodiment of fabricating cores with an angle shift which is half the prescribed angle. In this example, a die is prepared which is shifted by half the prescribed angle with respect to the rolling direction for the shape of rotors or stators, and the core manufactured with this die is assembled with the identical core that was turned over.

Referring to FIG. 19, a punching die is provided that is shifted by an angle which is half the prescribed angle with respect to the rolling direction of the core workpiece. The core workpiece is inserted in this punching die and the cores are punched out. In FIG. 19, the reference numeral 5A represents a punching die which is formed by angular shifting through an angle which is half the prescribed angle, and the punched out cores 1a are shifted through an angle which is half the prescribed angle with respect to the rolling direction.

In the fabrication of the stacked core, some of a plurality of cores are turned around and over and assembled. As a result, the angular shift of the stacked cores becomes the prescribed angle.

Figure 20:
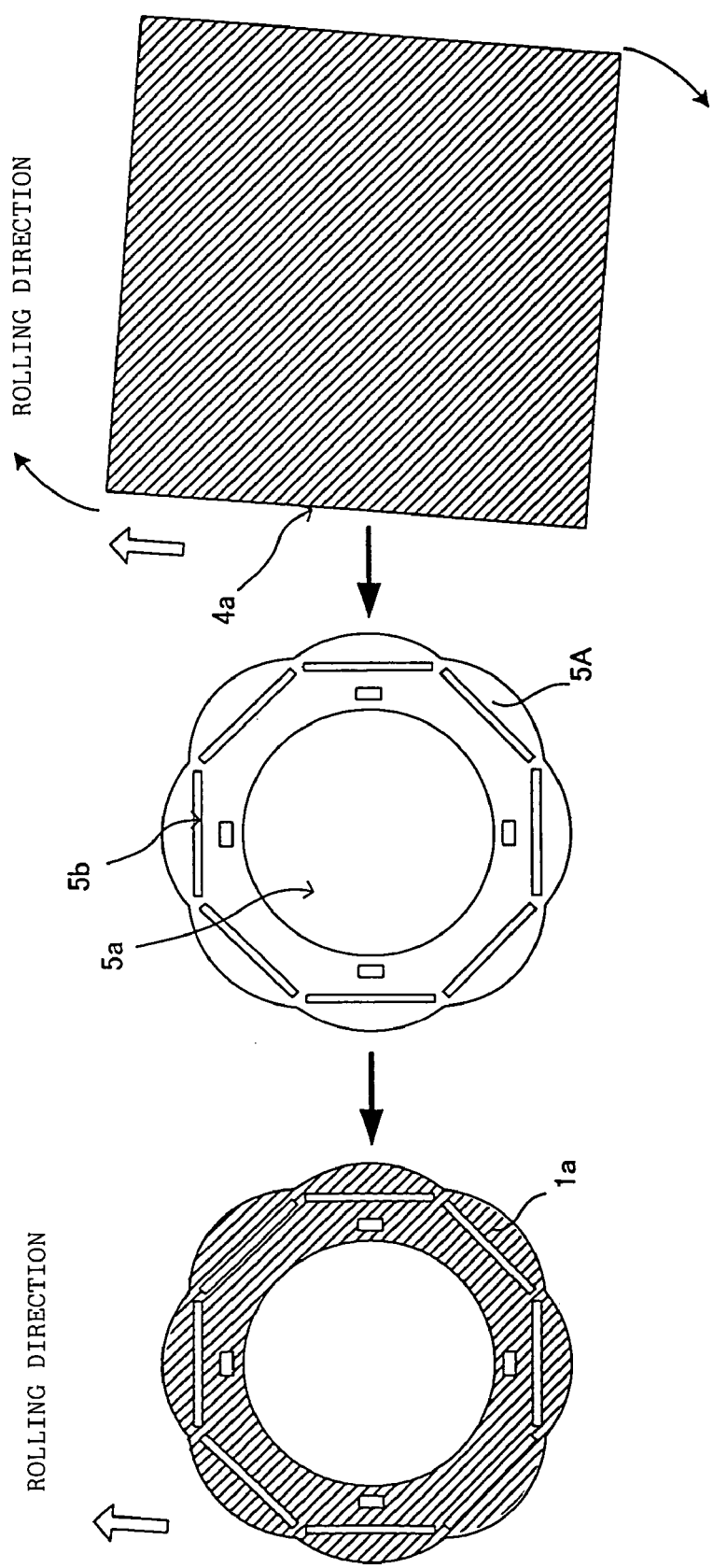
FIG. 20 is a drawing illustrating the second embodiment of fabricating cores with an angle shift which is half the prescribed angle.

FIG. 20 is a drawing illustrating the second embodiment of fabricating cores with an angle shift which is half the prescribed angle. In this embodiment, a core workpiece is punched out with a shift by an angle which is half the prescribed angle with respect to the rolling direction, and the cores manufactured by this process are assembled with the identical cores that were turned over.

Referring to FIG. 20, punching of the core is conducted by shifting the core workpiece 4a by an angle which is half the prescribed angle with respect to the rolling direction of the core workpiece. In FIG. 20, the die 5A for punching is disposed without angular shifting with respect to the rolling direction, and the cores are punched out by inserting the core workpiece 4a with an angular shift with respect to the rolling direction. The punched out cores 1a are shifted by an angle which is half the prescribed angle with respect to the rolling direction.

In the fabrication of a stacked core, some of a plurality of cores are turned around and over and assembled. As a result, the angular shift of the stacked cores becomes the prescribed angle.

Figure 21:
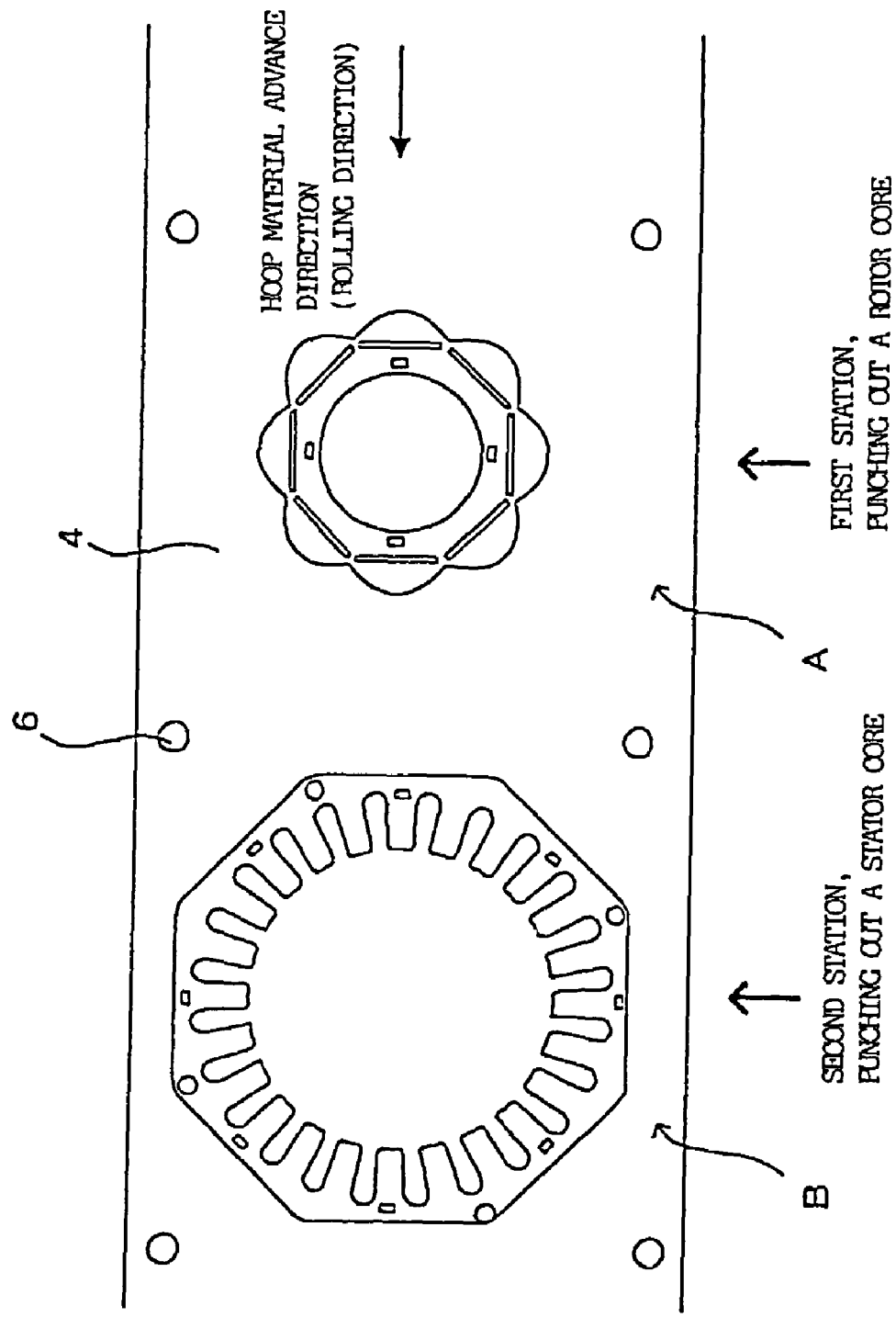
FIG. 21 illustrates the process of punching out rotor cores and stator cores with the conventional progressive die.

Punching out a rotor core and a stator core with a progressive die will be described below. The progressive die comprises a plurality of stations along the movement direction of the hoop material which is a workpiece for punching, and punching out with a die is carried out in each station. FIG. 21 illustrates how a rotor core or a stator core is punched out with the conventional progressive die.

Referring to FIG. 21, a die for punching out the rotor cores is disposed in the first station A, and a die for punching out the stator cores is disposed in the second station B. With the progressive die, the rotor cores and stator cores are sequentially fabricated by punching out the rotor cores in the first station A and punching out the stator cores in the second station B. With the entire die system, one rotor core and one stator core are fabricated simultaneously in one punching operation. As a result, the number of cores that are fabricated within a unit time is doubled with respect to the case in which rotor cores and stator cores were punched out separately. Furthermore, a pilot hole 6 is provided in the hoop material 4 of flat rolled magnetic steel sheets and strip, and this hole is used for alignment.

In the explanation provided hereinabove, the rotor cores and stator cores are fabricated in one station, but it is also possible to employ a plurality of stations, one station being provided for each component of the core. For example, in the fabrication of rotor cores, one station is provided for punching out a shaft hole, one station is provided for punching out the magnet holes, and one station is provided for punching out the outer shape of the rotor. Furthermore, in the fabrication of stator cores, one station is provided for punching out the inner shape of the stator, one station is provided for punching out the slots, one station is provided for punching out the fixing holes of the stator, and one station is provided for punching out the outer shape of the stator.

An example of applying the present invention to the above-described progressive die will be described below.

Figure 22:
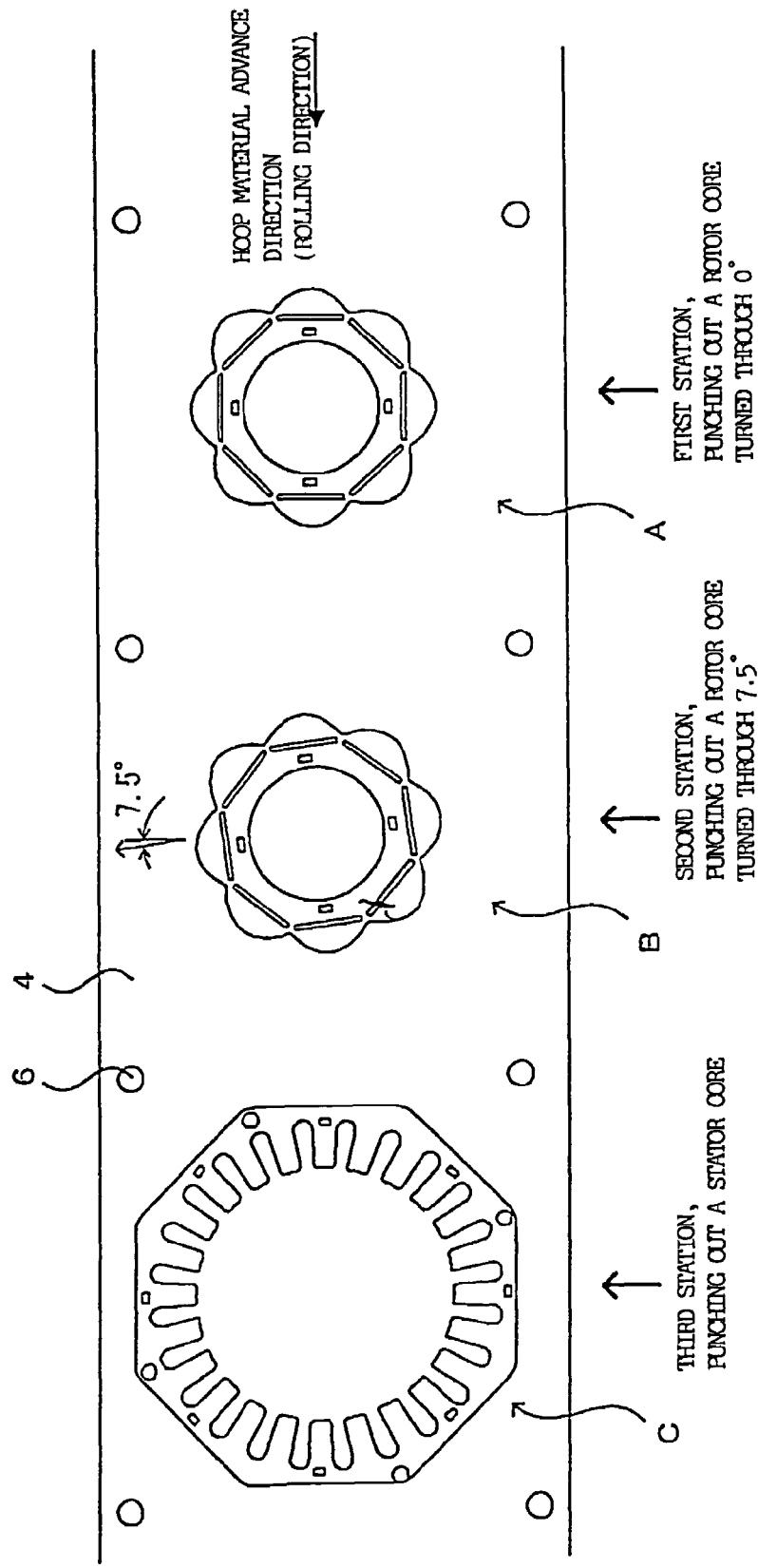
FIG. 22 illustrates an application example of a progressive die.

FIG. 22 illustrates an example of employing a progressive die. In this application example, three stations A, B, C are provided along the movement direction of the hoop material 4 of flat rolled magnetic steel sheets and strip. The first station A is provided with a die for punching out a rotor core turned through an angle of 0°, the second station B is provided with a die for punching out a rotor core turned through an angle of 7.5°, and the third station C is provided with a die for punching out a stator core.

The hoop material 4 is fed by intervals equal to a lateral spacing between the stations and inserted into the progressive die. Punching with the progressive die is carried out in two stages. In the first stage, a rotor core turned through an angle of 0° is punched out in the first station A. In the second station B, no punching of the rotor core is conducted, and a stator core is punched out in the third station C. As a result, a rotor core turned through an angle of 0° and a stator core are fabricated.

In the second stage, no punching of the rotor core is conducted in the first station A. A rotor core turned through an angle of 7.5° is punched out in the second station B, and a stator core is punched out in the third station C. As a result, a rotor core turned through an angle of 7.5° and a stator core are fabricated. Further, control unit (not shown in the figures) can be used to control whether the punching operation is carried out or not in any station in the first stage and second stage.

With the aforesaid progressive die, rotor cores turned through an angle of 0° with respect to the rolling direction of the hoop material, rotor cores turned through an angle of 7.5°, and stator cores can be fabricated successively. A motor core can be then fabricated by aligning and stacking the fabricated rotor cores or stacking the stator cores.

With the above-described application example of the progressive die, the number of die stations is increased, but the number of cores fabricated per unit time can be the same as in the conventional manufacturing process. As a result, the rotor cores with different angles with respect to the rolling direction can be fabricated, while maintaining the productivity.

An example of constructing a motor by combining a step shift of rotor cores and rotation of stator cores with respect to the rolling direction will be described hereinbelow with reference to FIG. 21.

Figure 23:
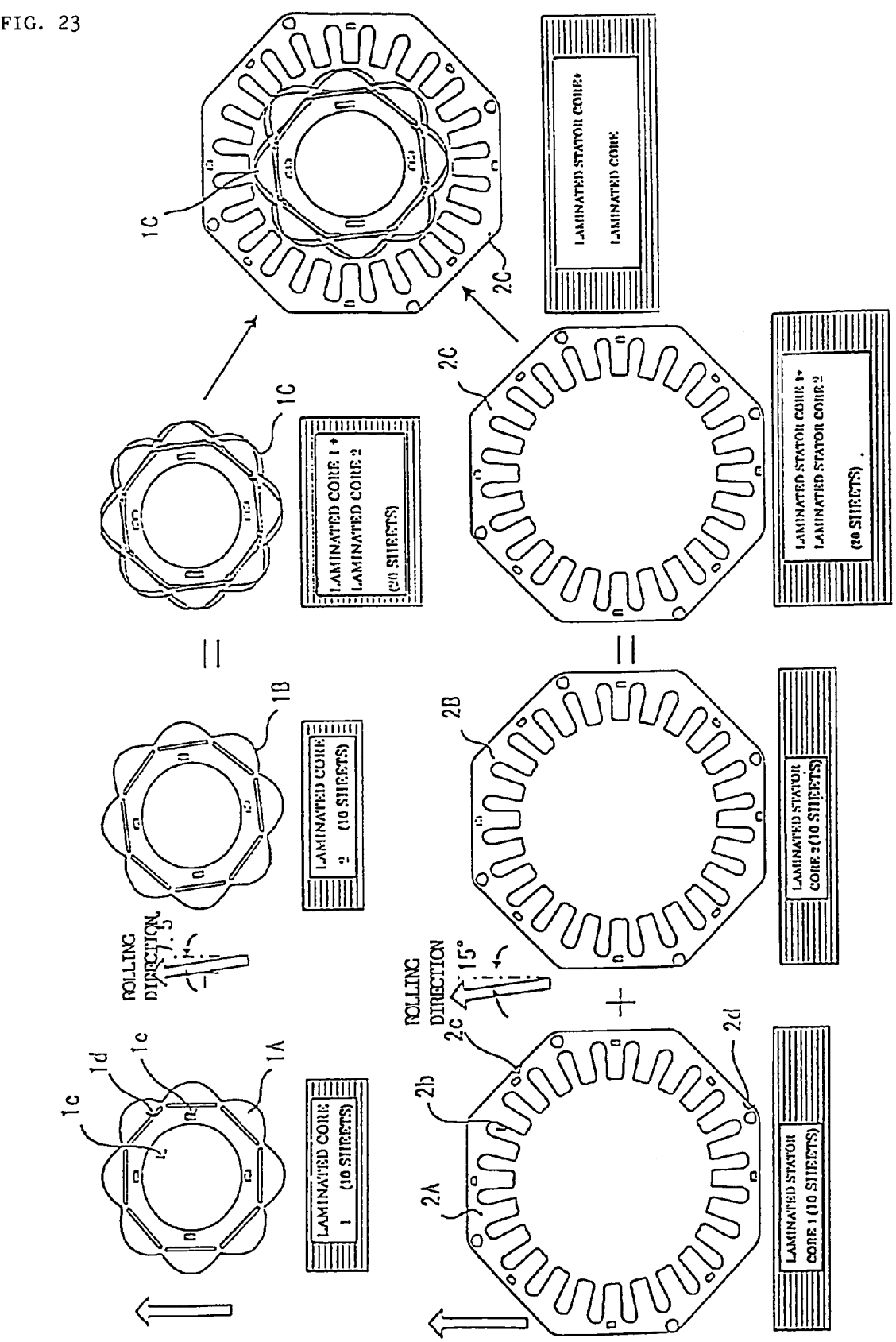
FIG. 23 illustrates the motor configuration in which step shifting of rotor cores is combined with rotation with respect to the rolling direction of the stator cores.

FIG. 23 shows an example of a motor with 8 poles and 24 slots. In the motor with 8 poles and 24 slots, due to a symmetry of the core shape, a cogging torque containing 24-frequency components (15° period) is generated in one revolution. Here, the cogging torque of 24-frequency components is reduced by conducting a 7.5° step shift by turning the shape of the rotor cores.

In this case, in order to reduce the cogging torque component generated with 8 periods in one revolution due to magnetic anisotropy, the stator cores are turned with respect to the rolling direction. Though the turning angle corresponding to 8 periods is 22.5°, the turning angle of the stator cores is set to 15° with respect to the rolling direction by deducting the rotation component caused by shape rotation of the rotor cores. As a result, it is possible to reduce both the cogging torque of 24-frequency components caused by the core shape and the cogging torque of 8-frequency components caused by magnetic anisotropy. Skewing can be also employed in addition to step shift of the rotor core.

In such a way, the cogging torque caused by shape factors such as a rotor shape, stator shape, and die accuracy can be reduced and the cogging torque caused by magnetic anisotropy can be also reduced.

In the explanation provided below, the angle of cores which are to be stacked was considered as a single angle defined by an odd number multiple of about (360°/(number of poles in the motor×natural number n×2)) or an odd number multiple of about (360°/(number of slots in the motor×natural number n×2)), and an example was shown in which only one frequency component is reduced for the cogging torque generated within one revolution. However, the present invention also makes it possible to reduce a plurality of frequency components for a cogging torque generated within one revolution.

For example, when components of a cogging torque generated 16 times (number of poles in the motor is 8 and the natural number is 2) in one revolution are reduced, the angle of cores which are to be stacked becomes an odd number multiple of 11.25° from the aforesaid angle formula. Furthermore, when components of a cogging torque generated 24 times (number of poles in the motor is 8 and the natural number 3) in one revolution are reduced, the angle of cores which are to be stacked becomes an odd number multiple of 7.5° from the aforesaid angle formula. From the explanation provided hereinabove, it follows that 16 cogging torque components per one revolution can be reduced by selecting an angle which is an odd number multiple of 11.25°, and 24 cogging torque components per one revolution can be reduced by selecting an angle which is an odd number multiple of 7.5°.

Here, if the angles which are close to the angle which is an odd number multiple of 11.25° and the angle which is an odd number multiple of 7.5° are found, they will be 33.75° and 37.5°. The angle which is almost close to the angle which is an odd number multiple of the angle obtained with the aforesaid angle formula can be obtained by setting the angle close to those two angles, for example, an angle of 36°.

Therefore, the present invention makes it possible to reduce a plurality of frequency components with respect to the cogging torque generated in one revolution by selecting an angle which includes a certain angle width in the angle which is an odd number multiple of the angle defined by the aforesaid angle formula.

Further, the turning angle of the stacked cores in accordance with the present invention is an angle which is an odd number multiple of about (360°/(number of poles in the motor×natural number n×2)) or an angle which is an odd number multiple of about (360°/(number of slots in the motor×natural number n×2)). More specifically, the aforesaid turning angle includes a certain angle width, with regard to an angle which is an odd number multiple of (360°/(number of poles in the motor×natural number n×2)) or to an angle which is an odd number multiple of (360°/(number of slots in the motor×natural number n×2)).

The aforesaid angle width can include, in addition to an angle for providing for correspondence to a plurality of frequency components relating to the cogging torque generated within one revolution, an angle which will make it possible to obtain a prescribed reduction effect, though this angle width has a certain angle with respect to the angle determined by the formula according to the actual distribution of magnetic properties.

Therefore, the turning angle of the stacked cores in accordance with the present invention can include a certain angle range which will make it possible to obtain a prescribed cogging torque reduction effect, in addition to the angle determined by the aforesaid formula.

The same is also applied to the case where continuous skewing is conducted. The explanation above related to the case of conducting continuous skewing within an angle range which is a natural number multiple of (360°/(number of poles in the motor×natural number n)) or an angle range which is a natural number multiple of (360°/(number of slots in the motor×natural number n)) of the angle of the cores which are to be stacked, and an example was shown in which only one frequency component is reduced for the cogging torque generated within one revolution. However, the present invention also makes it possible to reduce a plurality of frequency components for a cogging torque generated within one revolution.

For example, when reducing components of a cogging torque generated 16 times (number of poles in the motor is 8 and the natural number 2) in one revolution, the aforesaid angle range becomes 22.5°. Furthermore, when reducing the components of a cogging torque generated 24 times (number of poles in the motor is 8 and the natural number 3) in one revolution, the angle range becomes 15°. From the explanation provided hereinabove, it follows that 16 cogging torque components per one revolution can be reduced by selecting an angle range which is a natural number multiple of 22.5°, and 24 cogging torque components per one revolution can be reduced by selecting an angle which is a natural number multiple of 15°.

Here, if the angles which are close to the angle which is a natural number multiple of 22.5° and the angle which is a natural number multiple of 15° are found, they will be 45° and 45°. In this case, equal values are obtained for the two angles, but generally the matching angles are not obtained, and the angles almost close to the angles which are natural number multiples of the angle range obtained with the aforesaid angle formula can be obtained by setting the angles close to those two angles.

Therefore, the present invention makes it possible to reduce a plurality of frequency components of cogging torque generated in one revolution by selecting an angle which includes a certain angle width in the angle range determined by the aforesaid angle formula.

Further, the continuous skewing angle range of the stacked cores in accordance with the present invention is an angle which is a natural number multiple of about (360°/(number of poles in the motor×natural number n)) or an angle which is a natural number multiple of about (360°/(number of slots in the motor×natural number n)). More specifically, the aforesaid skewing angle range includes a certain angle width, with respect to an angle which is a natural number multiple of (360°/(number of poles in the motor×natural number n)) or an angle which is a natural number multiple of (360°/(number of slots in the motor×natural number n)).

The aforesaid angle width can include, in addition to an angle for providing for correspondence to a plurality of frequency components relating to the cogging torque generated within one revolution, an angle which will make it possible to obtain a prescribed reduction effect, though this angle width has a certain angle with respect to the angle determined by the formula according to the actual distribution of magnetic properties.

Therefore, the turning angle of the stacked cores in accordance with the present invention can include a certain angle range which will make it possible to obtain the prescribed cogging torque reduction effect, in addition to the angle determined by the aforesaid formula.

Orientation of crystals in the flat rolled magnetic steel sheets and strip is the cause of magnetic anisotropy. One of the orientations (orientation of easy magnetization) of crystals usually matches the rolling direction.

Each of the above-described configurations of the present invention can be also adapted to a configuration which takes into account the orientation of crystals in the flat rolled magnetic steel sheets and strip. For example, a cogging torque which is due to magnetic anisotropy caused by the orientation of crystals in the flat rolled magnetic steel sheets and strip is reduced by using a common die and assembling flat rolled magnetic steel sheets and strip manufactured by turning the orientation of crystal grains through the prescribed angle and the flat rolled magnetic steel sheets and strip manufactured without such turning. Furthermore, this prescribed angle is selected as the angle which is half the conventional angle, mating the surface core and the core obtained by turning it over becomes mating the cores shifted through the prescribed angle, and the prescribed angle shift is formed.

When the cores are produced with the progressive die, usually a doubled number of stations is required to turn the die through the prescribed angle in order to reduce the cogging torque caused by magnetic anisotropy. The increase in the number of stations results in the increased total length of the progressive die and the cores cannot be punched out with the typical press. With the present configuration, the number of stations can be reduced by commonly using the station for which die rotation is not required.

For example, in the case of large repetitiveness, in the example shown in FIG. 1, the number of slots is 24 and the shaft hole is unlimited. With respect to slots, because of shape repetitiveness, stacking can be conducted upon turning through an angle (15, 30, 45, . . . , 345, 360 degrees) which is a natural number multiple of 360/24. Among those angles and the odd number multiple (5.625, 16.875, . . . ) of the prescribed angle (for example, 360/8 poles/n =4/2) which cancels the magnetic anisotropy, the close ones are 15 degrees and 16.875 degrees. In other words, if the slots are turned through 15 degrees, it becomes almost equal to the prescribed angular shift. In this case, punching the slots out with the same die and stacking slots (cores) turned through 15 degrees and slots (cores) remaining at 0 degree can take care of magnetic anisotropy. The same is true for the shaft holes because the number of cycles is considered to be unlimited.

For the shapes with small repetitiveness, in the example shown in FIG. 1, there are 8 stator outer shapes and 4 rod holes. In this case, the angle (45, 90, . . . , 360 degrees) becomes a natural number multiple of 360/8 in the case of stator outer shapes, and an angle close to the angle canceling the magnetic anisotropy cannot be obtained. Accordingly, with respect to shapes with small repetitiveness, two stations are prepared to take care of magnetic anisotropy.

Furthermore, in progressive dies, after one core has been punched out, several cores are assembled and stacked to form a block. Because the cores with adjusted outer shapes are not obtained of the usual cores and the cores turned through the prescribed angles, a station is added to rotate the cores with the object of adjusting the rod position or outer shape. The angle thereof has a direction opposite to the above-described angle.

The technology of the present invention can be applied to rotary electric machines such as motors or power generators.

What is claimed is:

1. A motor comprising
a stacked core which is formed by stacking a plurality of cores composed of flat rolled magnetic steel sheets and strip, wherein
in the stacked core, at least one core is considered as a stacking unit and the cores are rotor cores and stator cores;
said stator cores are stacked by turning each stacking unit through an angle which is an odd number multiple of about (360°/(number of poles in the motor×natural number n×2)) with respect to the rolling direction; and
said rotor cores are stacked by turning each stacking unit through an angle which is an odd number multiple of about (360°/(number of slots in the motor×natural number n×2)) with respect to the rolling direction.

2. The motor according to claim 1, wherein
the value of said natural number n is selected such that the (number of poles in the motor×natural number n) in said (360°/(number of poles in the motor×natural number n×2)) becomes equal to the number of slots in the motor or close thereto, or
the value of said natural number n is selected such that the (number of slots in the motor×natural number n) in the (360°/(number of slots in the motor×natural number n×2)) becomes equal to the number of poles in the motor or close thereto.

3. A motor comprising:
a stacked core which is formed by stacking a plurality of cores composed of flat rolled magnetic steel sheets and strip, wherein
in the stacked core, at least one core is considered as a stacking unit and the cores are rotor cores and stator cores;
said stator cores are stacked by skewing continuously at angles obtained by proportionally dividing an angle range of one period by the number of stacked pieces, where an angle which is a natural number multiple of about (360°/(number of poles in the motor×natural number n)) is the angle range of one period, or at an angle obtained by adding the angle obtained by shifting by an angle which is an integer multiple of one period angle to those proportionally divided angles, for each stacking unit with respect to the rolling direction;
and the rotor cores are stacked by skewing continuously at angles obtained by proportionally dividing an angle range by the number of stacked pieces, where an angle which is a natural number multiple of about (360°/(number of slots in the motor×natural number n)) is the angle range of one period, or at an angle obtained by adding the angle obtained by shifting by an angle which is an integer multiple of one period angle to those proportionally divided angles, for each stacking unit with respect to the rolling direction.

4. The motor according to claim 3, wherein
the value of said natural number n is selected such that the (number of poles in the motor×natural number n) in said (360°/(number of poles in the motor×natural number n×2)) becomes equal to the number of slots in the motor or close thereto, or
the value of said natural number n is selected such that the (number of slots in the motor×natural number n) in the (360°/(number of slots in the motor×natural number n×2)) becomes equal to the number of poles in the motor or close thereto.

5. A motor comprising:
a stacked core which is formed by stacking a plurality of cores composed of flat rolled magnetic steel sheets and strip, wherein
in the stacked core, at least one core is considered as a stacking unit and the cores are rotor cores and stator cores;
said stator cores are stacked by turning each stacking unit through an angle such that the difference between angles, which are odd number multiples of (360°/

(number of poles in the motor×natural number [n1, n2, . . . ]×2)), for no less than two natural numbers (n1, n2, . . . ), is within a prescribed angle range with respect to the rolling direction of said core; and said rotor cores are stacked by each stacking unit turning through an angle such that the difference between angles which, are odd number multiples of (360°/(number of slots in the motor×natural number [m1, m2, . . . ]×2)), for no less than two natural numbers (m1, m2, . . . ), is within a prescribed angle range with respect to the rolling direction of said core.

6. The motor according to claim 5, wherein the values of said natural numbers n1 and n2 are selected such that the (number of poles in the motor×natural numbers [n1, n2]) in the (360°/(number of poles in the motor× natural number [n1, n2]×2)) becomes equal to the number of slots in the motor or close thereto, or the values of said natural numbers m1 and m2 are selected such that the (number of slots in the motor×natural number [m1, m2]) in the (360°/(number of slots in the motor×natural number [m1, m2]×2)) becomes equal to the number of poles in the motor or close thereto.

7. A motor comprising:

a stacked core which is formed by stacking a plurality of cores composed of flat rolled magnetic steel sheets and strip, wherein in the stacked core, at least one core is considered as a stacking unit and the cores are rotor cores and stator cores;

said stator cores are stacked by skewing continuously at angles obtained by proportionally dividing an angle range of one period by the number of stacked pieces, where an angle such that the difference between angles which are natural number multiples of (360°/(number of poles in the motor×natural number [n1, n2, . . . ]), for no less than two natural numbers (n1, n2, . . . ), is within a prescribed angle range, is the angle range of one period, or at an angle obtained by adding the angle obtained by shifting by an angle which is an integer multiple of said one period to those proportionally divided angles, for each stacking unit with respect to the rolling direction of the core; and said rotor cores are stacked by skewing continuously at angles obtained by proportionally dividing an angle range of one period by the number of stacked pieces, where an angle such that the difference between angles which are natural number multiples of (360°/(number of slots in the motor×natural number [m1, m2, . . . ]), for no less than two natural numbers (m1, m2, . . . ), is within a prescribed angle range, is the angle range of one period, or at an angle obtained by adding the angle obtained by shifting by an angle which is an integer multiple of said one period to those proportionally divided angles, for each stacking unit with respect to the rolling direction of the core.

8. The motor according to claim 7, wherein the values of said natural numbers n1 and n2 are selected such that the (number of poles in the motor×natural numbers [n1, n2]) in the (360°/(number of poles in the motor×natural number [n1, n2]×2)) becomes equal to the number of slots in the motor or close thereto, or the values of said natural numbers m1 and m2 are selected such that the (number of slots in the motor×natural number [m1, m2]) in the (360°/(number of slots in the motor×natural number [m1, m2]×2)) becomes equal to the number of poles in the motor or close thereto.

9. The motor of any of claims 1 through 8, wherein the angle of said rotor core includes the angle through which said rotor core was shifted by shape, and the angle of said stator core includes the angle through which the stator core was shifted by shape.

10. A motor comprising:

a magnetic material having a rolling direction;

a first stator core stamped from said magnetic material at a first core angle relative to said rolling direction;

a second stator core stamped from said magnetic material at a second core angle relative to said first core angle, said second core angle being substantially equal to (360°/(said number of poles in the motor×a second core natural number n×2));

said first stator core disposed stackably on said second stator core;

a first rotor core stamped from said magnetic material at a first rotor angle relative to said rolling direction;

a second rotor stamped from said magnetic material at a second rotor angle relative to said first rotor angle, said second rotor angle being substantially equal to (360°/(said number of slots in the motor×a second rotor natural number n×2)); and said first rotor disposed stackably on said second rotor.

* * * * *

UNITED STATES PATENT AND TRADEMARK OFFICE
CERTIFICATE OF CORRECTION

PATENT NO. : 7,002,277 B2 Page 1 of 1
APPLICATION NO. : 10/792915
DATED : February 21, 2006
INVENTOR(S) : Tomonaga Yamamoto et al.

It is certified that error appears in the above-identified patent and that said Letters Patent is hereby corrected as shown below:

Title page item [73] under Assignee: delete "LTC," and insert --LTD,--

Title page under FOREIGN PATENT DOCUMENTS: after "3/1998" insert --HO2K 1/18-- column 12, line 1, delete "FIG." and insert --FIGS.-- column 12, line 3, delete "FIG." and insert --FIGS.-- column 12, line 8, delete ";." and insert --;--

Signed and Sealed this

First Day of August, 2006

JON W. DUDAS
*Director of the United States Patent and Trademark Office*